United States Patent
Chen et al.

(10) Patent No.: US 9,030,529 B2
(45) Date of Patent: May 12, 2015

(54) DEPTH IMAGE ACQUIRING DEVICE, SYSTEM AND METHOD

(75) Inventors: Chia-Chen Chen, Hsinchu (TW); Wen-Shiou Luo, Hsinchu (TW); Tung-Fa Liou, Hsinchu (TW); Yu-Tang Li, New Taipei (TW); Chang-Sheng Chu, Hsinchu (TW); Shuang-Chao Chung, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 589 days.

(21) Appl. No.: 13/442,886

(22) Filed: Apr. 10, 2012

(65) Prior Publication Data

US 2012/0262553 A1    Oct. 18, 2012

Related U.S. Application Data

(60) Provisional application No. 61/475,648, filed on Apr. 14, 2011.

(30) Foreign Application Priority Data

Dec. 27, 2011    (TW) .............................. 100148939 A

(51) Int. Cl.
   *H04N 13/02* (2006.01)
   *G01B 11/25* (2006.01)
   *H04N 13/00* (2006.01)
(52) U.S. Cl.
   CPC ............ *G01B 11/25* (2013.01); *H04N 13/0011* (2013.01); *H04N 13/0239* (2013.01); *H04N 13/0253* (2013.01)
(58) Field of Classification Search
   USPC .......................................................... 348/47
   See application file for complete search history.

(56) References Cited

U.S. PATENT DOCUMENTS

| 7,103,212 B2 | 9/2006 | Hager et al. |
| 7,433,024 B2 | 10/2008 | Garcia et al. |

(Continued)

FOREIGN PATENT DOCUMENTS

| CN | 1742294 | 3/2006 |
| CN | 101179661 | 5/2008 |

(Continued)

OTHER PUBLICATIONS

Yang et al., "Multi-Resolution Real-Time Stereo on Commodity Graphics Hardware", In IEEE Computer Society Conference on Computer Vision and Pattern Recognition, vol. 1, Jun. 2003, pp. 211-217.

(Continued)

*Primary Examiner* — Dave Czekaj
*Assistant Examiner* — Leron Beck
(74) *Attorney, Agent, or Firm* — Jianq Chyun IP Office

(57) ABSTRACT

A depth image acquiring device is provided, which includes at least one projecting device and at least one image sensing device. The projecting device projects a projection pattern to an object. The image sensing device senses a real image. In addition, the projecting device also serves as a virtual image sensing device. The depth image acquiring device generates a disparity image by matching three sets of dual-images formed by two real images and one virtual image, and generates a depth image according to the disparity image. In addition, the depth image acquiring device also generates a depth image by matching two real images, or a virtual image and a real image without verification.

57 Claims, 14 Drawing Sheets

(56) References Cited

U.S. PATENT DOCUMENTS

| | | |
|---|---|---|
| 2004/0151345 A1 | 8/2004 | Morcom |
| 2009/0096783 A1 | 4/2009 | Shpunt et al. |
| 2010/0289878 A1 | 11/2010 | Sato et al. |
| 2010/0299103 A1 | 11/2010 | Yoshikawa |
| 2010/0315490 A1 | 12/2010 | Kim et al. |
| 2011/0012995 A1 | 1/2011 | Watanabe et al. |

FOREIGN PATENT DOCUMENTS

| | | |
|---|---|---|
| CN | 101496032 | 7/2009 |
| CN | 101496033 | 7/2009 |
| CN | 101860760 | 10/2010 |
| JP | 2009-528514 | 8/2009 |
| TW | 200405720 | 4/2004 |
| TW | 201024658 | 7/2010 |
| TW | 201033724 | 9/2010 |
| TW | 201039047 | 11/2010 |
| WO | 2007052262 | 5/2007 |
| WO | 2007/096893 | 8/2007 |
| WO | 2007/105205 | 9/2007 |

OTHER PUBLICATIONS

Koschan et al., "Dense depth maps by active color illumination and image pyramids", Advances in Computer Vision, 1997, pp. 137-148.

Scharstein et al., "High-Accuracy Stereo Depth Maps Using Structured Light", In IEEE Computer Society Conference on Computer Vision and Pattern Recognition, vol. 1, Jun. 2003, pp. 195-202.

Brown et al., "Advance in Computational Stereo", IEEE Transactions on Analysis and Machine Intelligence 25(8), Aug. 2003, pp. 993-1008.

ated on Apr. 14, 2011
DEPTH IMAGE ACQUIRING DEVICE, SYSTEM AND METHOD

CROSS-REFERENCE TO RELATED APPLICATION

This application claims the priority benefits of U.S. provisional application Ser. No. 61/475,648, filed on Apr. 14, 2011 and Taiwan application serial no. 100148939, filed on Dec. 27, 2011. The entirety of each of the above-mentioned patent applications is hereby incorporated by reference herein and made a part of this specification.

BACKGROUND

1. Technical Field

The disclosure relates to a depth image acquiring device, system, and a method thereof.

2. Related Art

Conventional image sensors are sophisticatedly developed, but with which only two-dimensional information can be acquired, so how to effectively, and stably acquire information of the third dimension (that is, depth) in real time is always a topic in technology development. A depth image can provide more complete spatial image information, and thus can be designed as an operation interface of 3D games or an interactive browsing device. In addition, the depth image also has a great development potential in application in safety image monitoring, robot vision, and medical imaging. At the end of 2010, Microsoft Corporation officially releases a new generation of smart sensory game device Kinect using human actions as an interactive medium of games, in which a depth sensor is a main core element. It can be expected that technology and application thereof related to gesture and human interactive interface will arouse great interest in a next year.

Although a passive image comparison method in the prior art also can calculate a depth image, the passive image comparison method is very liable to influence of the changes in color and brightness of the image due to the high dependence on feature information of the image per se. In case that the image feature is not obvious (for example, blocks of the same color or a white wall), or the ambient brightness is varied (for example, too dark or too bright), a poor comparison result is generally caused, and thus the stability is greatly compromised. Another depth sensing technology is the so-called Time of Flight (TOF) technology, but which suffers from insufficient resolution (160×120-320×240) and limited response rate at present.

An image matching method is disclosed in a document. In the method, matching operations of square difference and sum-of-square-difference (SSD) are directly performed with a dual-image acquired by using stereo vision, and accelerated by GPU. In addition, image features are also created by projecting color codes by using an active light source, and then a match acceleration operation is performed by a pyramid algorithm.

Furthermore, it is disclosed in a document that a gray code pattern is projected, and a sequence of stereo image pairs are acquired by using two cameras, so as to decode spatial locations thereof.

In addition, it is proposed in a document that a main spot pattern is projected, then multiple reference images acquired at different distances are established, and an image correlation calculation for a measured image and the reference patterns is performed, to obtain a distance of the object. In the method, one projecting device and one image acquiring device are used.

It is disclosed in another document that only 1 reference image is established, then correlation calculation for an acquired image of an object and the reference image is performed, and a depth value is obtained according to an offset of a location of a region corresponding to a highest correlation.

A document discloses a system and a method for acquiring a three-dimensional image of a scene. The system includes a projecting device which projects a locally unique pattern to a scene, and multiple sensors for acquiring images of the scenario from two or more observation points. Matching calculation of corresponding pixels in the images is performed, to establish a depth pattern.

A document discloses a device for generating depth information, which includes a projector and a left and a right video cameras. The projector projects a predefined structured light pattern to an object, and each of the left and right video cameras acquires a structured light image, corresponding points of the two images and the projected pattern are determined through decoding calculation of structured light, to obtain depth information. When the structured light pattern cannot be applied with the images, stereo matching of the left and right images is performed, to calculate the depth information.

SUMMARY

According to an exemplary embodiment, a depth image acquiring device is introduced herein, which includes at least one projecting device, a first and a second image sensing device, and an image processing unit. The projecting device projects a projection pattern to an object, in which the projecting device serves as a virtual image sensing device, and an inherent image of the projection pattern serves as a virtual image. The first and the second image sensing device sense the projection pattern projected to the object respectively, to generate a first real image and a second real image. The image processing unit is coupled to the projecting device and the first and the second image sensing device. The image processing unit matches a first pixel in the first real image with that in the second real image, to obtain a first matched image; and matches the first pixel in the first real image with that in the virtual image, to obtain a second matched image; performs verification by using the first and the second matched image, to output a verified matched image, in which a pixel in the verified matched image is one of the pixels in the first and the second matched image; and generates a disparity image according to a value of pixels in the first real image and a value of pixels in the verified matched image, and calculates a corresponding depth value according to the disparity image, so as to generate a depth image.

According to another exemplary embodiment, a depth image acquiring device is introduced herein, which includes a first and a second projecting device, an image sensing device, and an image processing unit. The first and the second projecting device respectively project a projection pattern on an object, in which the first and the second projecting device serve as a first and a second virtual image sensing device, and an inherent image of the projection pattern serves as a first and a second virtual image imaged by the first and the second virtual image sensing device. The image sensing device senses the projection pattern projected to the object, to generate a real image. The image processing unit is coupled to the first and the second projecting device, and the image sensing device. The image processing unit matches a first pixel in the real image with that in the first virtual image, to obtain a first matched image and matches the first pixel in the real image with that in the second virtual image, to obtain a second matched image; performs match verification by using the first and the second matched image, to output a verified matched image, in which a pixel in the verified matched image is one of the pixels in the first and the second matched image; and generates a disparity image according to values of pixels in the real image and pixels in the verified matched image, and calculates a corresponding depth value according to the disparity image, so as to generate a depth image.

According to another exemplary embodiment, a depth image acquiring method is introduced herein, which is used for acquiring a depth image of an object, and is applicable to a depth image acquiring device which includes a projecting device, and a first and a second image sensing device. According to the method, the projecting device projects a projection pattern to the object, and the first and the second image sensing device sense the projection pattern projected to the object, to generate a first real image and a second real image. The projecting device serves as a virtual image sensing device, and converts an inherent image of the projection pattern into a virtual image. Then, a first pixel in the first real image is matched with that in the second real image, to obtain a first matched image; and the first pixel in the first real image is matched with that in the virtual image, to obtain a second matched image. Match verification is performed by using the first and the second matched image, to output a verified matched image, in which a pixel in the verified matched image is one of the pixels in the first and the second matched image. A disparity image is generated according to a value of pixels in the first real image and pixels in the verified matched image, and a corresponding depth value is calculated according to the disparity image, so as to generate a depth image.

According to another exemplary embodiment, a depth image acquiring method is introduced herein, through which a depth image of an object is acquired by using a depth image acquiring device which includes a first and a second projecting device, and an image sensing device. According to the method, the first and the second projecting device respectively project a projection pattern on the object, and the image sensing device senses the projection pattern projected to the object, to generate a real image, in which the first and the second projecting device serve as a first and a second virtual image sensing device, and convert an inherent image of the projection pattern into a first and a second virtual image. A first pixel in the real image is matched with that in the first virtual image, to obtain a first matched image; and the first pixel in the real image is matched with that in the second virtual image, to obtain a second matched image. Match verification is performed by using the first and the second matched image, to output a verified matched image, in which a pixel in the verified matched image is one of the pixels in the first and the second matched image. A disparity image is generated according to values of pixels in the real image and pixels in the verified matched image, and a corresponding depth value is calculated according to the disparity image, so as to generate a depth image.

According to another exemplary embodiment, a depth image acquiring device is introduced herein, which includes a projecting device, an image sensing device, and an image processing unit. The projecting device projects a projection pattern to an object, in which the projecting device serves as a virtual image sensing device, and an inherent image of the projection pattern serves as a virtual image. The image sensing device senses the projection pattern projected to the object, to generate a real image. The image processing unit is coupled to the projecting device and the image sensing device. The image processing unit matches pixels in the real image with those in the virtual image, to obtain a matched image; and generates a disparity image according to values of the pixels in the real image and the pixels in the matched image, and calculates a corresponding depth value according to the disparity image, so as to generate a depth image.

According to another exemplary embodiment, a depth image acquiring device is introduced herein, which includes at least one projecting device, a first and a second image sensing device, and an image processing unit. The projecting device projects a projection pattern to an object. The first and the second image sensing device sense the projection pattern projected to the object respectively, to generate a first real image and a second real image. The image processing unit is coupled to the projecting device and the first and the second image sensing device. The image processing unit matches pixels in the first real image with those in the second real image respectively, to obtain a matched image; and generates a disparity image according to values of the pixels in the first real image and pixels in the matched image, and calculates a corresponding depth value according to the disparity image, so as to generate a depth image.

According to another exemplary embodiment, a depth image acquiring system is introduced, which is used to acquire a depth image of the object. The depth image acquiring system includes a plurality of depth image acquiring devices, in which each of the depth image acquiring devices may be any one of the above depth image acquiring devices.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

An exemplary embodiment provides a depth image acquiring device and a method thereof A projection pattern is projected to an object by using a light source (for example, an active light source), and then depth image information is calculated by using an image matching technology. An active projecting device is formed by a light source and a designed projection pattern generating elements, that is, a diffractive optical element (DOE) or a mask, in combination with a lens set, and can generate an irregularly distributed bright spot image, so as to form a pattern distributed in random. Size of an incident light beam is controlled and resolution of the bright spot image can be changed. In principle, calculation of a depth image is based on the image matching technology. Besides that at least two synchronous image sensing devices acquire images of the projection pattern, in an exemplary embodiment, the projecting device is further used as a virtual image sensing device, and a spatial corresponding relation between each image sensing device and the projecting device is calculated, so as to impair a problem of image occlusion and improve the accuracy.

Figure 1:
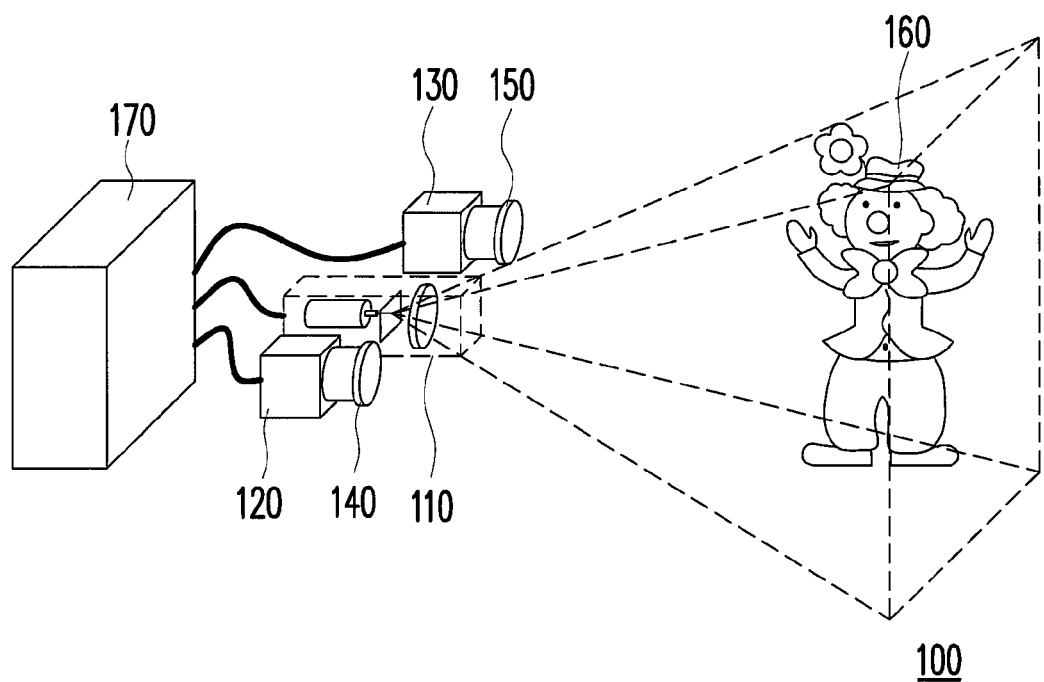
FIG. 1 is a schematic diagram illustrating a configuration of a depth image acquiring device according to an exemplary embodiment.

FIG. 1 is a schematic diagram illustrating configuration of a depth image acquiring device according to an exemplary embodiment. The depth image acquiring device according to the exemplary embodiment includes at least one projecting device 110, at least two image sensing devices 120 and 130, and an image processing unit 170. The projecting device 110 is, for example, an optical projecting device or a digital projecting device, and mainly projects a projection pattern of scattered light spots distributed at random to an object 160. The pattern of scattered light spots distributed at random may be pre-designed or generated automatically at random. The image sensing devices 120 and 130 mainly acquire images of the projection pattern after being projected to the object, so as to obtain image information. The image sensing devices 120 and 130 may be, for example, various devices such as an ordinary video camera or camera which can be used to acquire image information.

In addition, optical filters 140 and 150 may be further disposed respectively before the image sensing devices 120 and 130, which can filter light having unwanted wavelengths, before the light enters the image sensing devices 120 and 130, so as to effectively avoid the influence of an ambient light source, and the color of the object.

In addition, in the exemplary embodiment, the projecting device 110 is further used as a virtual image sensing device (which is described in detail below). The images acquired by the image sensing devices 120 and 130 and an image generated by the projecting device 110 serving as a virtual image sensing device are transferred to an image processing unit 170 together, which matches the images, to obtain a depth image pattern of the object 160.

For example, the image processing unit 170 matches pixels in a first real image sensed by the image sensing device 120 with pixels in a second real image sensed by the image sensing device 130, to obtain a first matched image and matches the pixels in the first real image with pixels in the virtual image, to obtain a second matched image; performs match verification by using the first and the second matched image, to output a verified matched image; and generates a disparity image according to values of the pixels in the first real image and pixels in the verified matched image, and calculates a corresponding depth value according to the disparity image, so as to generate a depth image.

Furthermore, in the exemplary embodiment, the projecting device 110 may be, for example, a large-area light spot distribution module. The projecting device 110 may basically include, for example, a light source, a projection pattern generating element, and a lens set. The light source emits a projecting light beam. The projection pattern generating element may be configured in a light path of the light source, and generate the projection pattern under the irradiation of the light source. The lens set is configured in a light path of the projection pattern generating element, and projects the projection pattern generated with the light source through the projection pattern generating element to the object 160. Then, exemplary embodiments of several projecting devices are described.

Figure 2A:
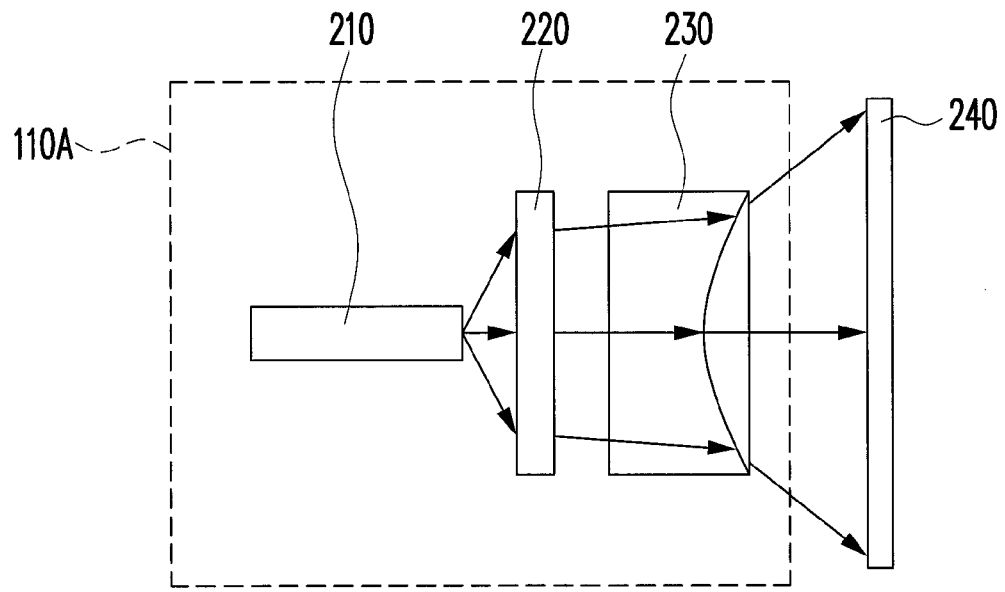
FIG. 2A is a schematic diagram illustrating a projecting device formed by a large-area light spot distribution module.

FIG. 2A is a schematic diagram illustrating a projecting device formed by a large-area light spot distribution module. As shown in FIG. 2A, a projecting device 110A includes a light source 210, a lens set 230, and a DOE 220 (that is, the above projection pattern generating element), in which the lens set 230 is an optional member. Light emitted from the light source 210 is projected to the DOE 220, with which the DOE 220 generates a diffraction pattern distributed as a light spot, and then the diffraction pattern is projected to a projection plane 240 (equivalent to the object 160 shown in FIG. 1). In addition, an area of the diffraction pattern may also be enlarged by the lens set 230, and then the diffraction pattern is projected to the projection plane 240. Furthermore, the lens set may include one or more lenses.

The light source 210 may be a light source having a specific spectrum, for example, a laser diode (LD), a light emitting diode (LED), and ultraviolet (UV) light or visible light of other spectra. A light emitting caliber of the light source 210 may be adjusted, to control the range of an emitted light beam projected to the DOE 220. The DOE 220 may be a computer generated hologram (CGH), a grating, or a phase DOE, which performs wave front modulation of the light source 210, to generate another diffraction pattern, for example, light spot distribution. Then, in another exemplary embodiment, a divergence angle of the light spot of the diffraction pattern may be increased by using the lens set 230, and a distribution area of the light spot on a plane at any location is enlarged due to a non-imaging design.

In addition, referring to FIG. 1, optical filter devices 140 and 150 having a specific spectrum corresponding to the light source 210 may be further used before the image sensing devices 120 and 130. At present, an infrared (IR) laser diode light source has a good effect, for example, an IR laser diode having a wavelength of 780 nm. As such, optical filter devices 140 and 150 corresponding to the wave band, for example, IR narrow band-pass filter, are used before the image sensing devices 120 and 130. In addition, a main wavelength of the IR narrow band-pass filter is 780 nm, and a bandwidth is 20 nm.

Light of the wave band projected to the object is returned through scattering, filtered light of other wavelengths by the optical filter devices 140 and 150, and then enters the image sensing device 120 and 130, so as to effectively avoid the influence of an ambient light source and the color of the object.

The large-area light spot distribution module further enlarges, together with the lens, the distribution of the spots generated by the DOE, that is, increase the divergence angle. In this way, for a fabrication size of the DOE, nanolithography of high cost can be avoided, and a routine very-large-scale integration (VLSI) can be used. In addition, the module can use a laser caliber of the light source 210 to adjust the size of the light spot. If the light spot projected through the DOE 220 is intended to be shrunk, the laser caliber may be increased, so that the resolution of the light spot is improved, and the accuracy of the system is increased.

Figure 2B:
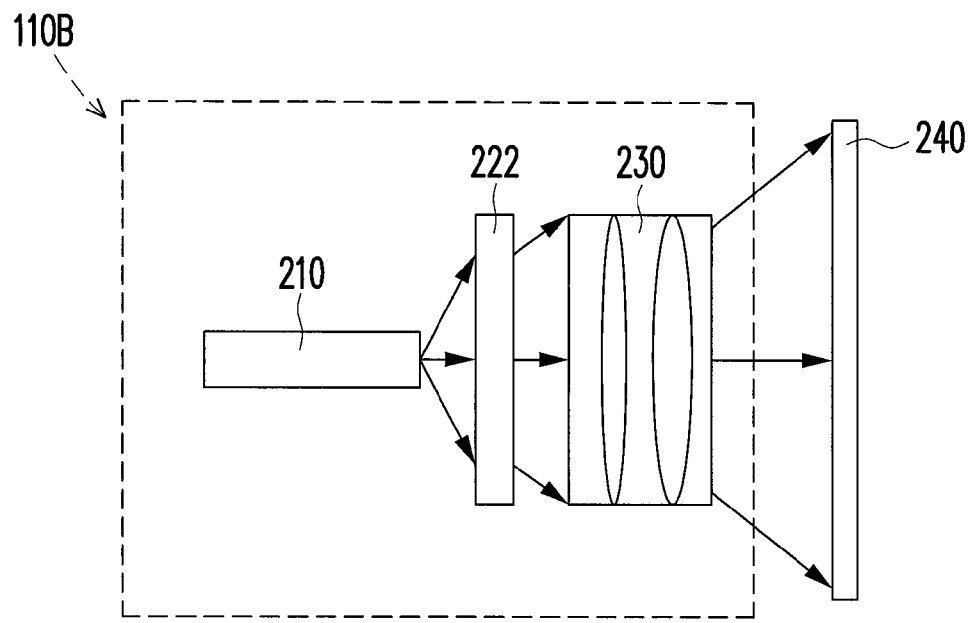
FIG. 2B is a schematic diagram illustrating a projecting device formed by a large-area light spot distribution module.

FIG. 2B is a schematic diagram illustrating another embodiment of a projecting device formed by a large-area light spot distribution module. Herein, the same numerals are assigned to elements having functions that are the same as or similar to those shown in FIG. 2A. Another embodiment of the large-area light spot distribution module is to project and enlarge, together with a lens set, light distribution of a light source passing through a mask.

As shown in FIG. 2B, a projecting device 110B includes a light source 210, a lens set 230, a mask 222 (that is, the above projection pattern generating element), in which the lens set 230 is an optional member. Light emitted from the light source 210 is projected to the mask 222, and generates a pattern distributed as a light spot after passing through the mask 222, and then the pattern is projected to a projection plane 240 (equivalent to the object 160 shown in FIG. 1). In addition, a projection area of the light spot distribution may also be enlarged by the lens set 230, and then the pattern is projected to the projection plane 240. Furthermore, the lens set 230 may include one or more lenses. Light projection passing through the mask 222 may be enlarged by using the lens set 230, so that a large-area light spot distribution may be formed in a specific space.

The light source may be, for example, an LD, or an LED. The mask may be, for example, a quartz glass sheet coated with a chromium metal film, a dot printing plate, or a metal plate. The mask 222 may be fabricated through a mask fabrication process in a routine VLSI. A light spot distraction area designed in the projection pattern is a light transmitting area on the mask 222.

In this embodiment, besides that the fabrication of elements is more time and cost saving, large-area light spot distribution such as images with VGA and XGA resolution are generated, thereby improving the accuracy of the system.

In addition, in the exemplary embodiment, for the image sensing device, a sensor having a better response curve corresponding to the wave band of the light source is selected. For example, when the light source is a LD having a spectrum of 780 nm, the image sensing device may be "PointGrey camera Firefly MV FFMV-03M2M (trade name)", which has a good near-IR response; however, this is only an example of the element, and the mentioned product is not necessarily used as an essential implementation element.

Figure 2C:
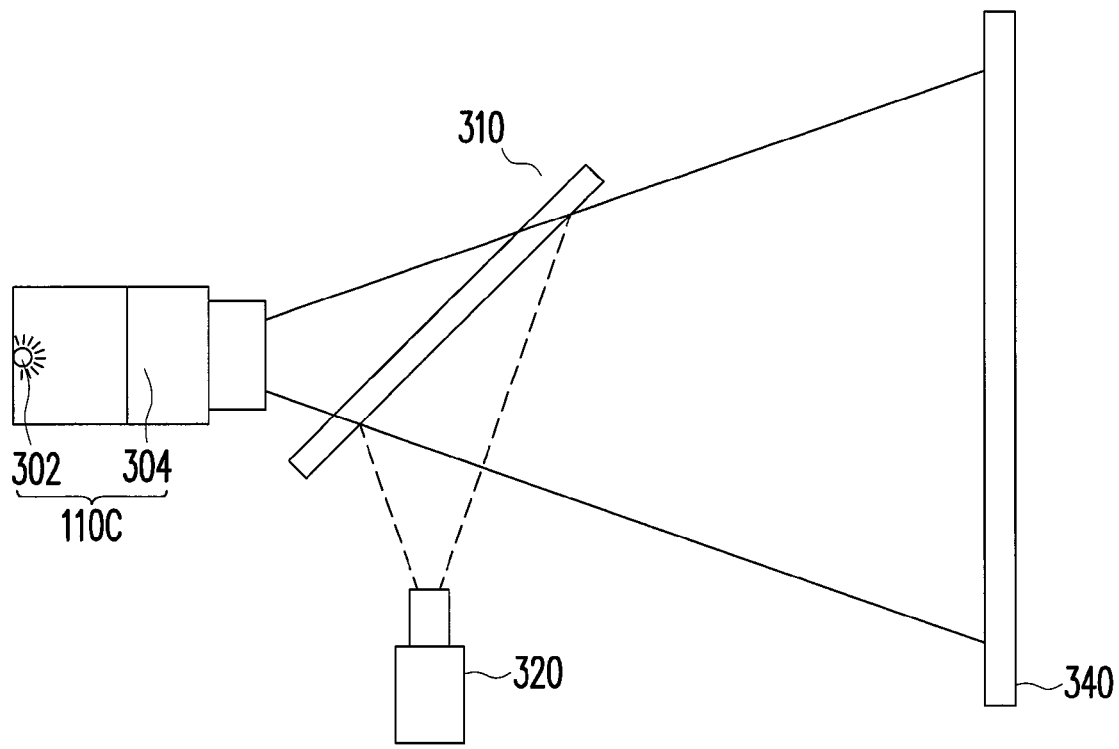
FIG. 2C is a schematic diagram illustrating a random image projecting device.

FIG. 2C is a schematic diagram illustrating a random image projecting device. The pattern projected by the projecting device shown in FIG. 2A and FIG. 2B is basically pre-designed, for example, the pattern on the mask or the DOE may be fabricated as desired. However, the pattern may be generated at random, and FIG. 2C shows an example. For example, a projecting device 110C has a light source 302 and ground glass 304 therein. Light emitted from the light source 302 passes through the ground glass 304 and generates a random image pattern, and then the image pattern is projected to a projection plane 340 (equivalent to the object 160 shown in FIG. 1).

Furthermore, as the projected image is generated at random, the projected image pattern cannot be known in advance. Therefore, when the projecting device is used, a semi-reflective mirror 310 is disposed in a projection light path in advance, and an image acquiring device 320 is disposed in a light path reflected by the semi-reflective mirror 310. The image acquiring device 320 is, for example, a coaxial image acquiring and correcting device. Through the coaxial image acquiring and correcting device, the image pattern projected by the projecting device 110C can be measured and corrected. After the projection pattern projected by the projecting device 110C is acquired and corrected, the projecting device 110C can be disposed in a depth image acquiring device.

Figure 3:
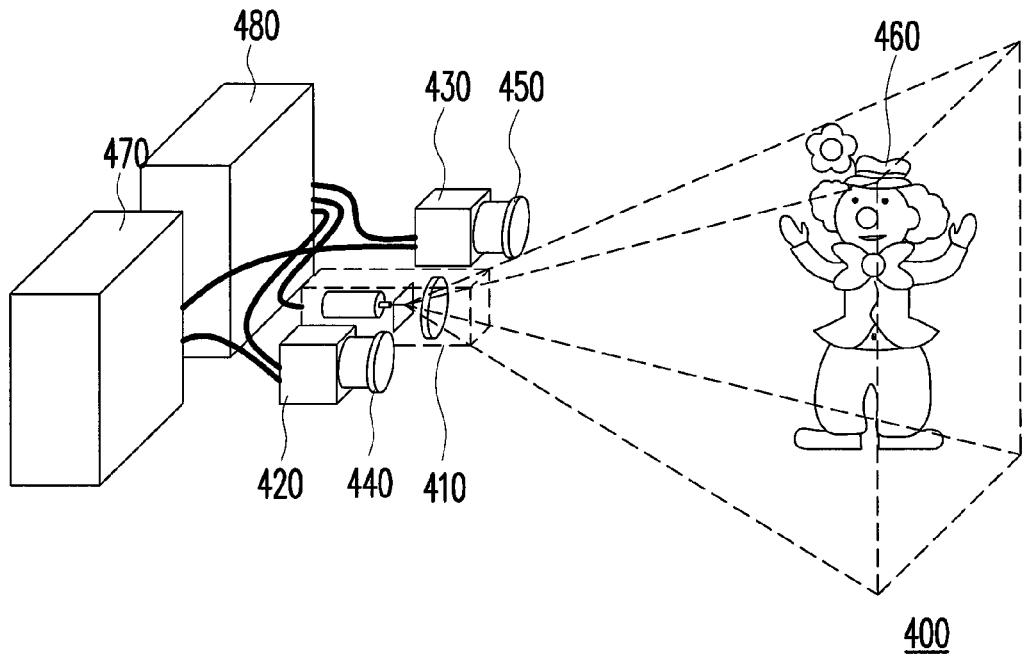
FIG. 3 is a schematic diagram illustrating configuration of a depth image acquiring device according to another exemplary embodiment.

FIG. 3 is a schematic diagram illustrating configuration of a depth image acquiring device according to another exemplary embodiment. As shown in FIG. 3, a depth image acquiring device 400 includes at least one projecting device 410, at least two image sensing devices 420 and 430, a control unit 480, and an image processing unit 470. The image sensing devices 420 and 430 acquire image information projected to an object 460, and may be, for example, a common video camera or an element which can acquire image data. The control unit 480 is coupled to the projecting device 410 and the image sensing devices 420 and 430 in a wire, wireless, or any other mode, as long as it can be ensured that a control signal can be transferred), and controls a light source (which is not shown, and may be made reference to FIGS. 2A to 2C) in the projecting device 410 and the image sensing devices 420 and 430.

The projecting device 410 may employ, for example, any manner shown in FIGS. 2A to 2C, for example, the projecting device 410 may projects a pre-designed pattern of scattered light spots distributed at random to the object 460. The image sensing devices 420 and 430 acquire an image projected to the object 460. The image processing unit 470 is coupled to the image sensing devices 420 and 430, and can receive the image data from the image sensing devices 420 and 430 and match the images, so as to obtain a depth image of the object 460.

In addition, optical filters 440 and 450 may be further disposed before the image sensing devices 420 and 430, by which light having unwanted wavelengths is filtered off before entering the image sensing devices 420 and 430, so as to effectively avoid the influence of an ambient light source, and the color of the object.

For the control of the light source, ON/OFF of the light source of specific spectrum in the projecting device 410 may be controlled by the control unit 480 in a pulse-wave driving mode, and control of synchronous image acquisition by the image sensing devices 420 and 430 may be selected or not selected.

When control of synchronous image acquisition is selected, the control unit 480 gives a synchronous signal, to synchronously drive the ON of the light source in the projecting device 410 when the image sensing devices 420 and 430 are controlled to acquire images. After the image sensing devices 420 and 430 acquire the images, the light source of the projecting device 410 is turned off.

In addition, when control of synchronous image acquisition is not selected, ON/OFF of the light source in the projecting device 410 may be directly controlled in a periodic pulse-wave driving mode. An ON/OFF frequency, a duty cycle (proportion of ON time), and a light flux (luminous intensity of the light source) of the light source in the projecting device 410 may be adjusted. Generally, for convenience of image acquisition, the light source may employ a high frequency, so as to maintain a stable image brightness control.

The control of the light source mentioned in the exemplary embodiment can save power, and improve the intensity of a single pulse wave of the light source, so that the resistance to interference of ambient light and other stray light is much high, and the injury to human eyes can also be lowered.

Figure 4:
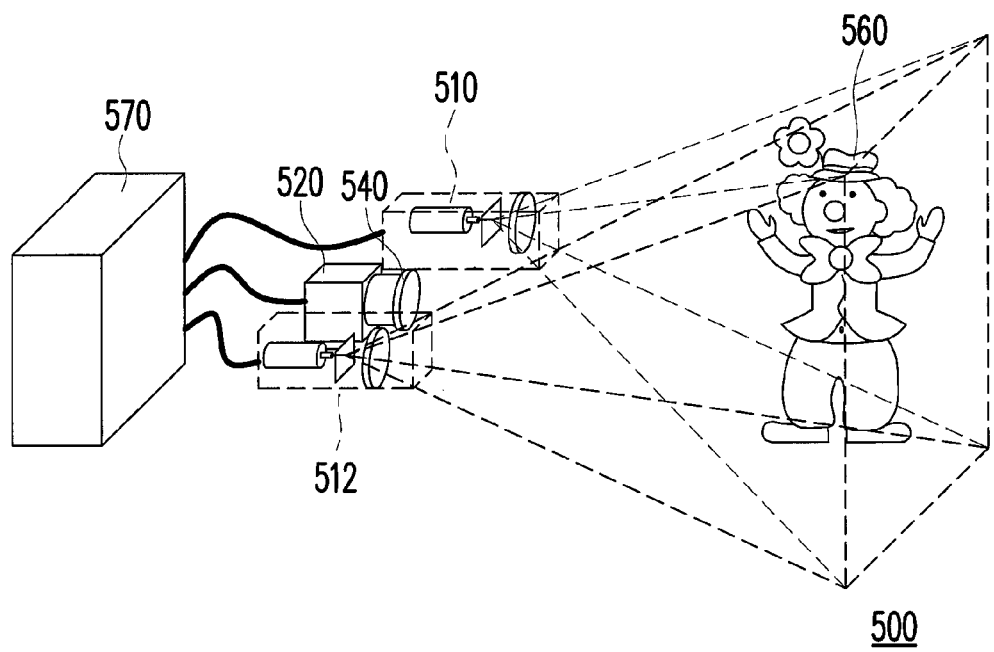
FIG. 4 is a schematic diagram illustrating configuration of a depth image acquiring device according to another exemplary embodiment.

FIG. 4 is a schematic diagram illustrating configuration of a depth image acquiring device according to another exemplary embodiment. As shown in FIG. 4, a depth image acquiring device 500 includes two projecting devices 510 and 512 and one image sensing device 520.

As described in the foregoing several exemplary embodiment, the projecting devices 510 and 512 may be in any form shown in FIGS. 2A to 2C, and project a projection pattern on an object 560. The image sensing device 520 acquires an image projected on the object 560. The image processing unit 570 is coupled to the image sensing device 520, and can receive image data from the image sensing device 520, and then matched images, so as to obtain a depth image of the object 560.

Similar to the configuration shown in FIG. 1, in the exemplary embodiment, two projecting devices 510 and 512 are used, and correspondingly two virtual image sensing devices exist. Similarly, the image gotten by the image sensing device 520 and images generated by the projecting devices 510 and 512 serving as the virtual image sensing devices are transferred to the image processing unit 570 together, and the images are matched, to obtain a depth image pattern of the object 560.

The image processing unit 570 matches pixels in a real image (for example, the image gotten by the image sensing device 520) with a first virtual image (for example, an inherent image from the projecting device 510), to obtain a first matched image; matches the pixels in the real image with a second virtual image (for example, an inherent image from the projecting device 512), to obtain a second matched image; performs match verification by using the first and the second matched image, to output a verified matched image, in which a pixel in the verified matched image is one of pixels in the first and the second matched image; and then generates a disparity image according to values of the pixels in the first real image and pixels in the verified matched image, and calculates a corresponding depth value according to the disparity image, so as to generate a depth image.

In addition, an optical filter 540 may be further disposed before the image sensing device 520, by which light having unwanted wavelengths is filtered off before entering the image sensing device 520, so as to effectively avoid the influence of an ambient light source, and the color of the object. When light projected by the projecting devices 510 and 512 is different shades (that is, has different spectra), a frequency band of the filter 540 can be designed to contain spectra of two different shades, so that images of two different spectra can both pass through the filter 540.

In addition, the image sensing device 520 can receive the image of two superimposed shades, and the subsequent image processing unit 570 can separate the superimposed image, and process respectively.

Figure 5:
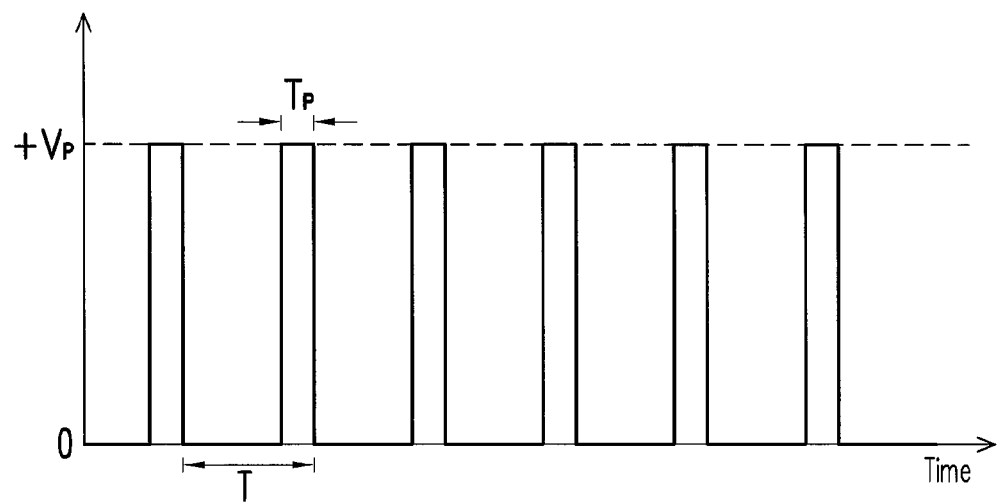
FIG. 5 is a schematic diagram illustrating waveform of an asynchronous pulse-wave driving mode of a controller shown in FIG. 3.

In addition, in the exemplary embodiment, an asynchronous pulse-wave driving mode may be used, which may be a periodic square-wave control signal, as shown in FIG. 5, in which a cycle T, a working cycle Tp, and a driving voltage Vp can be adjusted according to a specific application scenario.

Pulse-wave driving may also be control with other periodic waveform control signals, as long as periodic control of ON/OFF of a light source can be achieved. In control of the synchronous image acquisition, synchronous image acquisition and ON of the light source are triggered by the synchronous signal.

Figure 6A:
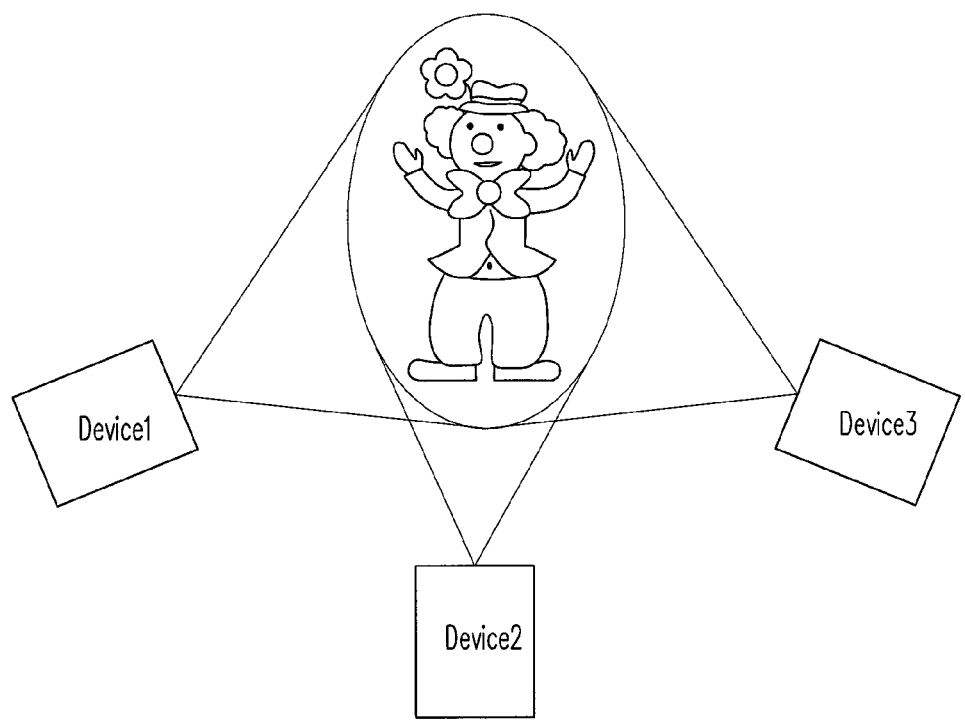
FIG. 6A illustrates a depth image acquiring system using multiple depth image sensing devices according to another exemplary embodiment.
Figure 6B:
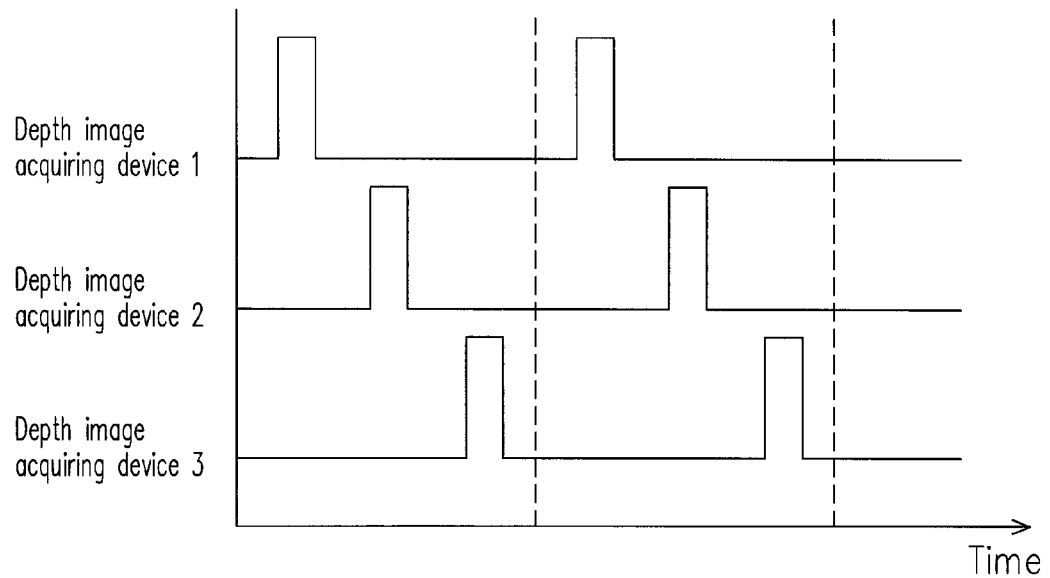
FIG. 6B is a schematic diagram illustrating timing sequence of a control signal corresponding to configuration shown in FIG. 6A.

FIG. 6A illustrates a depth image acquiring system according to another exemplary embodiment, and FIG. 6B is a schematic diagram illustrating timing of a control signal corresponding to configuration shown in FIG. 6A. As shown in FIG. 6A, according to the exemplary embodiment, in application, three depth image acquiring devices 1-3 are used to measure a depth image of the same object. The depth image acquiring devices 1-3 may be the depth image acquiring device shown in FIG. 1, 3, or 4.

As shown in FIG. 6B, in control of the depth image acquiring devices, the above pulse-wave driving mode may be used, except that ON time of a light source of each depth image acquiring device is staggered. It can be seen from FIG. 6B that on time of the light source in the duty cycle of the depth image acquiring devices 1-3 (example shown in FIG. 6B includes three devices; however, the disclosure is not limited thereto) is staggered from each other. That is, control pulse signals of the three depth image acquiring devices 1-3 have the same cycle, but different phases. In this case, an image sensing device in each of the depth image acquiring devices 1-3 is synchronous to ON/OFF of the light source of a corresponding projecting device; that is, in a period when a light source of the depth image acquiring device 1 is turned on, the image sensing device of the depth image acquiring device 1 acquires an image, and the image sensing devices of the depth image acquiring devices 2-3 is not enabled. In this way, the depth image acquiring devices 1-3 can employ the same cycle without interfering each other, so that the multiple depth image acquiring devices 1-3 can operate for the same scenario or object.

In addition, the control pulse signal of the depth image acquiring devices 1-3 may also be signals having different cycles, as long as ON time of the light source of each device must be staggered from each other.

Moreover, in the configuration shown in FIG. 1, 3, or 4, different depth accuracies can be obtained by altering a distance between the image sensing devices. In an application scenario with a short distance, the distance between the image sensing devices may be disposed to be small, and in an application with a long distance, the distance between the image sensing devices may be disposed to be large, so as to obtain a good distance accuracy. In practical application, a reference setting is that an image acquiring working distance is 1.5 to 5 m, and the distance between two image sensing devices is set at 18 cm. For example, if a camera of 640×480 pixels is used, the depth image acquiring device can achieve a depth resolution of 3 to 5 cm. If the image acquiring working distance is reduced to 0.5 to 1.5 m, and the same image sensing device is used, the distance may be adjusted to about 6 cm, and in this case, a depth resolution of 1 to 2 cm may be achieved.

Details for matching images in the exemplary embodiment are described in further detail below.

Then, a process for matching the images in the exemplary embodiment is described. Before the process is described, a manner and a principle of an optical projecting device serving as a virtual image sensing device are explained.

Figure 7:
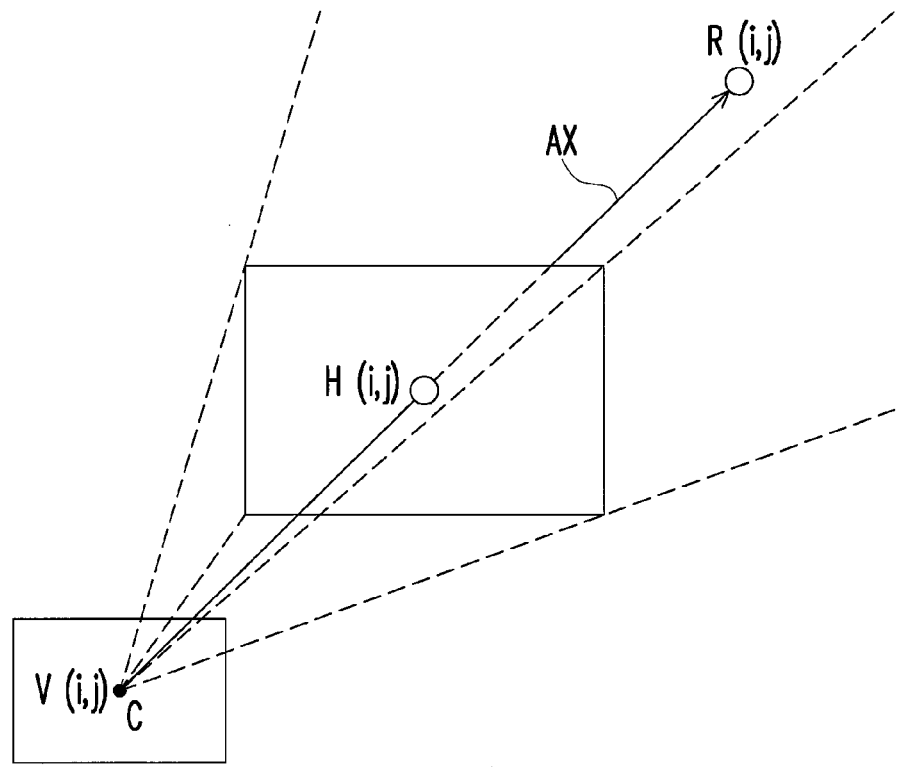
FIG. 7 is a schematic diagram illustrating relation between an inherent image and a virtual image when a projecting device serves as a virtual camera.

FIG. 7 is a schematic diagram illustrating relation between an inherent image and a virtual image when a projecting device serves as a virtual image sensing device. In this embodiment, a virtual image sensing device is a virtual camera. As shown in FIG. 7, the virtual camera (non-physical camera, or a device which is not a camera being used as a camera) referred to in the exemplary embodiment is a projecting device. As described above, the projecting device projects a pattern of scattered light spots to an object, and the projected pattern of scattered light spots is an inherent image. Generally, the inherent image may be projected in a Fan-shaped divergence manner and reach to the object.

In measurement, the projecting device has two main uses, one is to serve as a light source, so that a physical real camera (for example, the image sensing devices 120 and 130 shown in FIG. 1) can capture an image; and the other one is to create changes in brightness or color, so that the image acquired by the real camera has abundant features or changes, which favors for subsequent analysis of the image. The changes in brightness or color may be described with the inherent image. The inherent image is not data acquired by the image sensing device, but a two-dimensional data description manner. In implementation, various projecting devices may be designed, to project a light source to a space, so that the light generates various changes in brightness and light in the space according to the manner described by the inherent image.

If the projecting device is a common digital projector, the inherent image is a projected digital image. If the projecting device is a self-designed optical system, the inherent image may be directly derived from design data, or the inherent image can be estimated by designing a calibration method.

Herein, in this exemplary embodiment, the virtual camera is described with a pin-hole model, and thus the inherent image is an ideal image meeting the pin-hole model. In addition, when the projecting device is a defect, an anti-distortion correction method may be designed, to obtain an inherent image meeting the pin-hole model.

As shown in FIG. 7, when the projecting device is described with the pin-hole model, the projecting device can be considered as a virtual camera (a virtual image sensing device, which is referred to as virtual camera hereinafter). The optical axis AX and the projection center C of the virtual camera are absolutely identical to those of the projecting device, so that the location and size of a virtual image $V(i,j)$ imaged by the virtual camera are absolutely identical to or proportional to those of the inherent image $H(i,j)$ of the projecting device. As described above, the digital image acquired by the virtual camera can be described by Formula (1) below:

$$V(i,j)=aH(i,j)R(i,j) \quad 0 \le i<M \quad 0 \le j<N \tag{1}$$

In Formula (1), parameters and functions are defined as follows:

$V(i,j)$: a value of a pixlel at a column j and a row i of the virtual image of the virtual camera;
M and N: resolutions of the image;
a: proportional value between the virtual image and the inherent image
$H(i,j)$: a value of a pixel at a column j and a row i of the inherent image; and
$R(i,j)$: a reflectance of a point at which a straight line starting from the projecting center C and passing through the pixel $H(i,j)$ at the column j and the row i of the inherent image touches a shooting scene. The value is correlated to the property of the light source, an angle of reflection, and a material of the object.

The pixel value $V(i,j)$ may be a RGB color or brightness value; and the use of color or brightness values of other system is feasible, and the disclosure is not limited thereto. In practical application, for the reflectance $R(i,j)$, the inherent image $H(i,j)$ is a high-frequency signal. Therefore, as far as a local region of an image is concerned, the reflectance $R(i,j)$ is nearly a constant, as expressed by Formula (2) below. In Formula (2), (m, n) represents a range of surrounding neighborhood where the pixel $(i,j)$ at the column j and the row i is a center, and $\alpha$ is a proportional value.

$$V(m,n) \cong \alpha H(i,j) \quad (m,n) \in \text{neighborhood of } (i,j) \tag{2}$$

Therefore, when only a local region of the image is matched, the inherent image of the projecting device can be directly used, and the virtual image has no necessary to be used. For example, when image matching of the virtual camera and a real camera is performed, the inherent image $H(i,j)$ may be matched with a digital image $F(i,j)$ acquired by the real camera.

In addition, it is assumed that a function $D(v1, v2)$ calculates a difference between $v1$ and $v2$, and a function $N(i,j, F(i,j))$ is defined to normalize a pixel $(i,j)$ of the image F, so as to make a value of the pixel in the range of 0 to 1. Local matching operation of the pixel $(i,j)$ of the virtual image V and a pixel $(m, n)$ of the real image F may define a matching cost function MatchingCost $(i, j, m, n, V, F)$ as shown by Formula (3) below, in which a shape and a size of the neighborhood may be defined according to practical conditions.

$$\begin{aligned} \text{MatchingCost}(i, j, m, n, V, F) &= \sum_{(s,t) \in \text{neighborhood}} \\ & D(N(i+s, j+t, V(i+s, j+t)), \\ & N(m+s, n+t, F(m+s, n+t))) \\ &= \sum_{(s,t) \in \text{neighborhood}} \\ & D(N(i+s, j+t, H(i+s, j+t)), \\ & N(m+s, n+t, F(m+s, n+t))) \end{aligned} \tag{3}$$

According to the exemplary embodiment, the introduction of the concept of the virtual camera make the projecting device have a third function, that is, the projecting device has an inherent image, which can be matched with an image of a real camera, and analyzed. Therefore, a stereo system can be formed by using one camera and one projecting device, for image matching and triangulation measurement.

Based on the concept of the virtual camera, in the depth image acquiring device shown in FIG. 1, 3, or 4, one projecting device and two image sensing devices (or two projecting devices and one image sensing device) are converted into a system of three image sensing devices, that is, one virtual cameras plus two real camera (or two virtual cameras and one real camera). A virtual three-camera system under the configuration is described in detail below.

Figure 8:
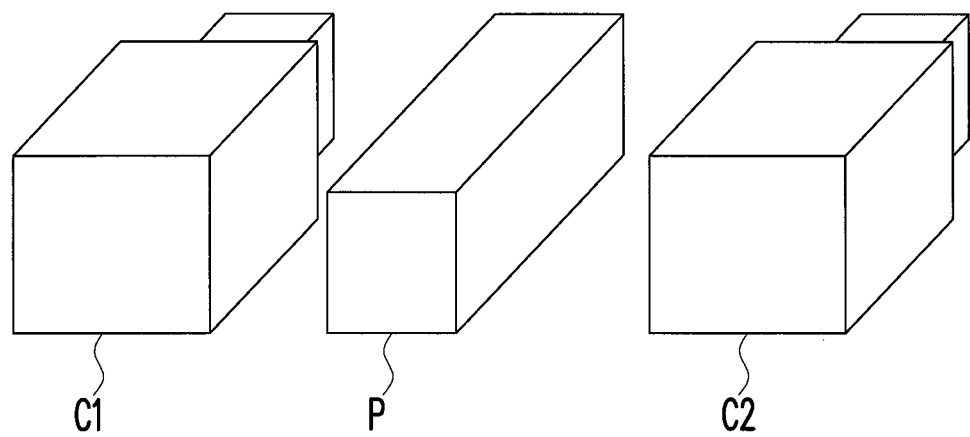
FIG. 8 and FIGS. 9A to 9E illustrate examples of various virtual three-camera systems given in an exemplary embodiment.
Figure 9A:
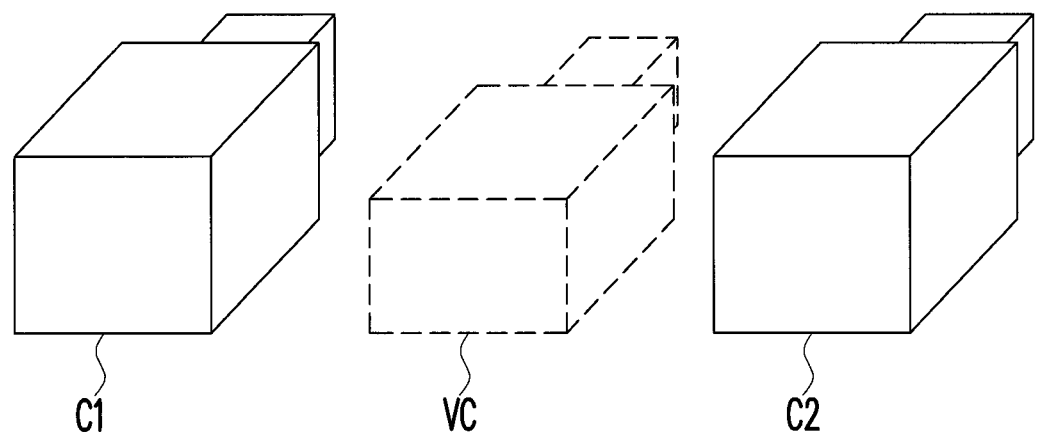

FIG. 8 and FIGS. 9A to 9E illustrate examples of various virtual three-camera systems given in an exemplary embodiment. FIG. 8 shows configuration formed by one projecting device P and two cameras C1 and C2 illustrated in FIG. 1, and FIG. 9A illustrates a schematic diagram of configuration in which a projecting device is converted into a virtual camera according to the concept of the exemplary embodiment.

The objective of the projecting device is originally to provide a light source and create changes in brightness and color. However, as shown in FIG. 9, when the projecting device is described as a virtual camera, the system becomes a virtual three-camera system, that is, one virtual camera VC plus two real cameras C1 and C2. The virtual three-camera system further has at least the following effects compared with the original stereo system actively projecting light.

First, the virtual three-camera system can verify image match results and exclude errors. The cameras in the system formed by one virtual camera and two real cameras are paired, to obtain three stereo systems. The three systems respectively matched images, to obtain three results, and camera imaging principles are met among the three results. For example, if a pixel $(i_1, j_1)$ of a camera 1 matches a pixel $(i_2, j_2)$ of a camera 2, and the pixel $(i_1, j_1)$ of the camera 1 matches a pixel $(i_3, j_3)$ of a camera 3, the $(i_2, j_2)$ and the $(i_3, j_3)$ must meet imaging relation formulas (which are, for example, obtained by camera correction and system calibration) of a three-cameral system. Meanwhile, when image matching is performed between the camera 2 and the camera 3, the pixel $(i_2, j_2)$ of the camera 2 must match the pixel $(i_3, j_3)$ of the camera 3, and the pixel $(i_3, j_3)$ of the camera 3 also must match the pixel $(i_2, j_2)$ of the camera 2.

Secondly, completeness of a measurement result is increased. In triangulation measurement, data of some regions cannot be measured generally due to the problem of occlusion, and the virtual three-camera system of this exemplary embodiment can alleviate the problem. Three stereo systems can be obtained through paring of the cameras in the virtual three-camera system, when measurement cannot be performed with one stereo system due to the occlusion problem, measurement data can be supplemented by using the rest two stereo systems. Only in case that the occlusion problem occurs to all of the three stereo systems, the measurement data cannot be obtained.

Figure 9B:
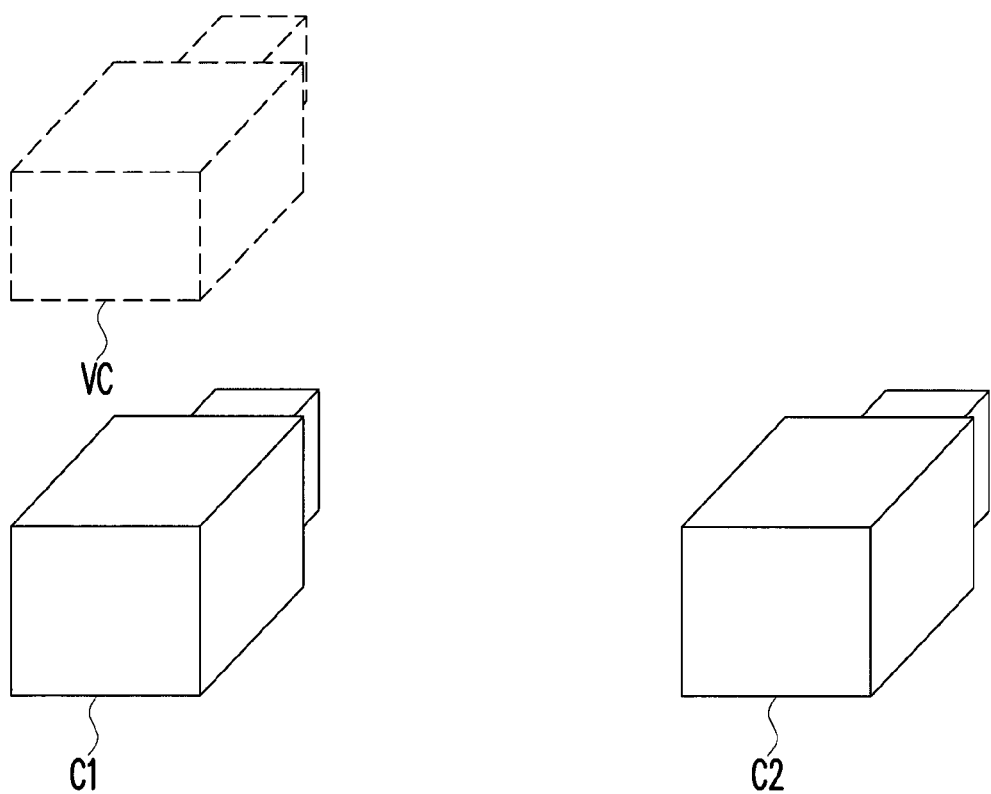
Figure 9C:
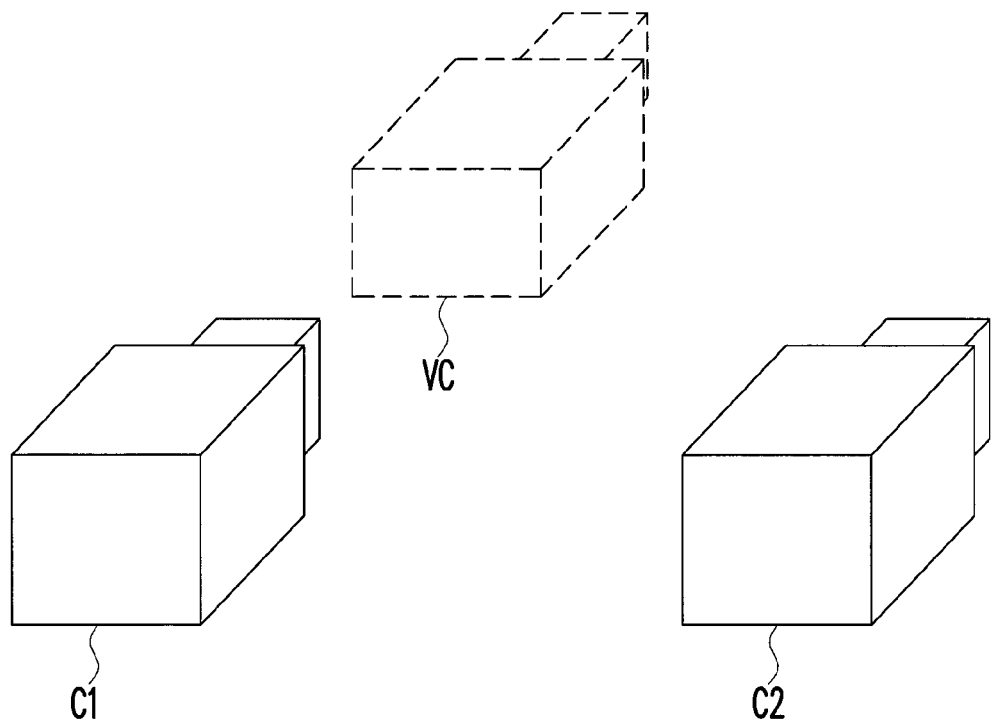

FIG. 9B illustrates another configuration manner of a virtual three-camera system, in which a horizontal disparity exists between two real cameras C1 and C2, and a vertical disparity exists between the real camera C1 and a virtual camera VC. Such a configuration manner is mainly to alleviate the occlusion problem. FIG. 9C illustrate another tradeoff configuration manner of a virtual three-camera system. For example, a virtual camera VC (a projecting device) is substantially located at a position above a connection line between real cameras C1 and C2, or may also located a position below the connection line definitely.

In addition, the configuration of the depth image acquiring device described above is formed by one projecting device and two image sensing devices (for example, cameras), however, two projecting devices in combination with one image sensing device (for example, camera) may also be used. In this case, the configuration of the exemplary embodiment is equivalent to a virtual three-camera system formed by two virtual cameras and one real camera.

Figure 9D:
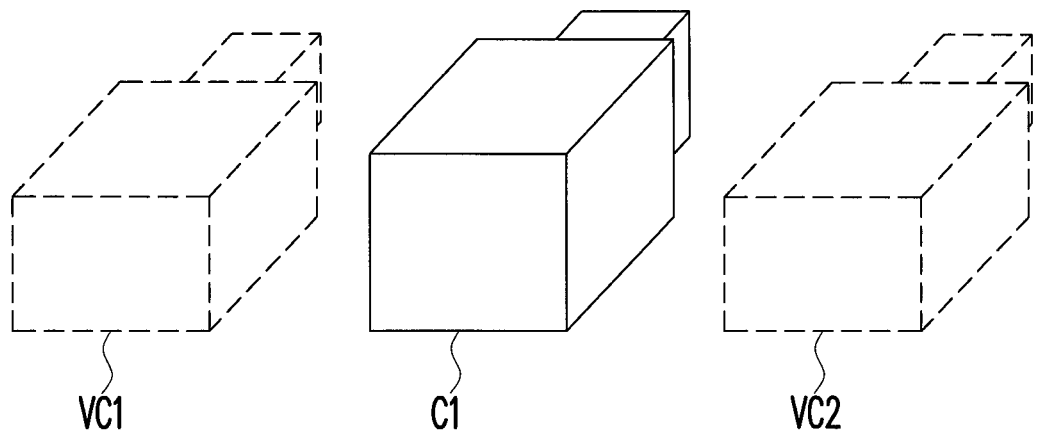
Figure 9E:
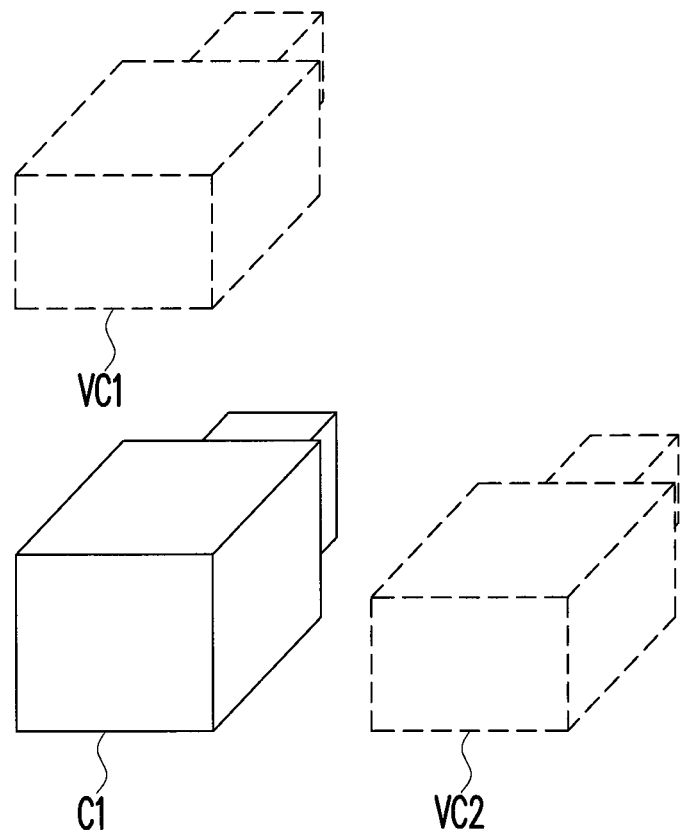

FIG. 9D and FIG. 9E illustrate examples of configuration of two configurations, and other configuration locations are also feasible. The configuration shown in FIG. 9D includes virtual cameras VC1 and VC2 and a real camera C1 that are substantially configured in a straight line, and the configuration is similar to that shown in FIG. 9A. The configuration shown in FIG. 9E is similar to that shown in FIG. 9B, in which a horizontal disparity exists between a real camera C1 and a virtual camera VC2, and a vertical disparity exists between the real camera C1 and a virtual camera VC1. The configuration shown in FIG. 9E has both the horizontal and the vertical disparity, so as to alleviate the occlusion problem.

In the three-camera system in this exemplary embodiment, only two stereo systems can be paired, because image matching cannot be performed between two virtual cameras. An advantage of the configuration is that only 1 camera is used. Except that there is no a third stereo system for additional matching, the configuration also has the two characteristics of "verification of image match results" and "increase of the completeness of a measurement result".

After the configuration in FIG. 9D or 9E is configured, for the control of the projecting devices, time division or spectrum division may be used to discriminate signals of the two projecting devices. In time division, the two projecting devices are turned on at different times, and the cameral captures an image in a corresponding time. In spectrum division, light sources of the two projecting devices have different wavelengths. In this case, the two projecting devices are turned on at the same time, but the cameral can distinguish different wavelengths. For example, the light sources of the two projecting devices respectively project green and red light, and a RGB color cameral can be used to acquire images at the same time, and separate the images generated by the two light sources.

Then, a data processing process for matching images in the exemplary embodiment when the virtual three-camera depth image acquiring device is used is described. In the virtual three-camera configuration, at least one is a virtual camera. In addition, for ease of description, the image sensing device in the depth image acquiring device is described with "camera" as an example, and referred to as real camera. The image matching processing may be directly performing matching operation by using real images acquired by two real cameras, or matching images of one projecting device (a virtual camera) and one real camera. Descriptions for the two cases are made below.

Figure 10:
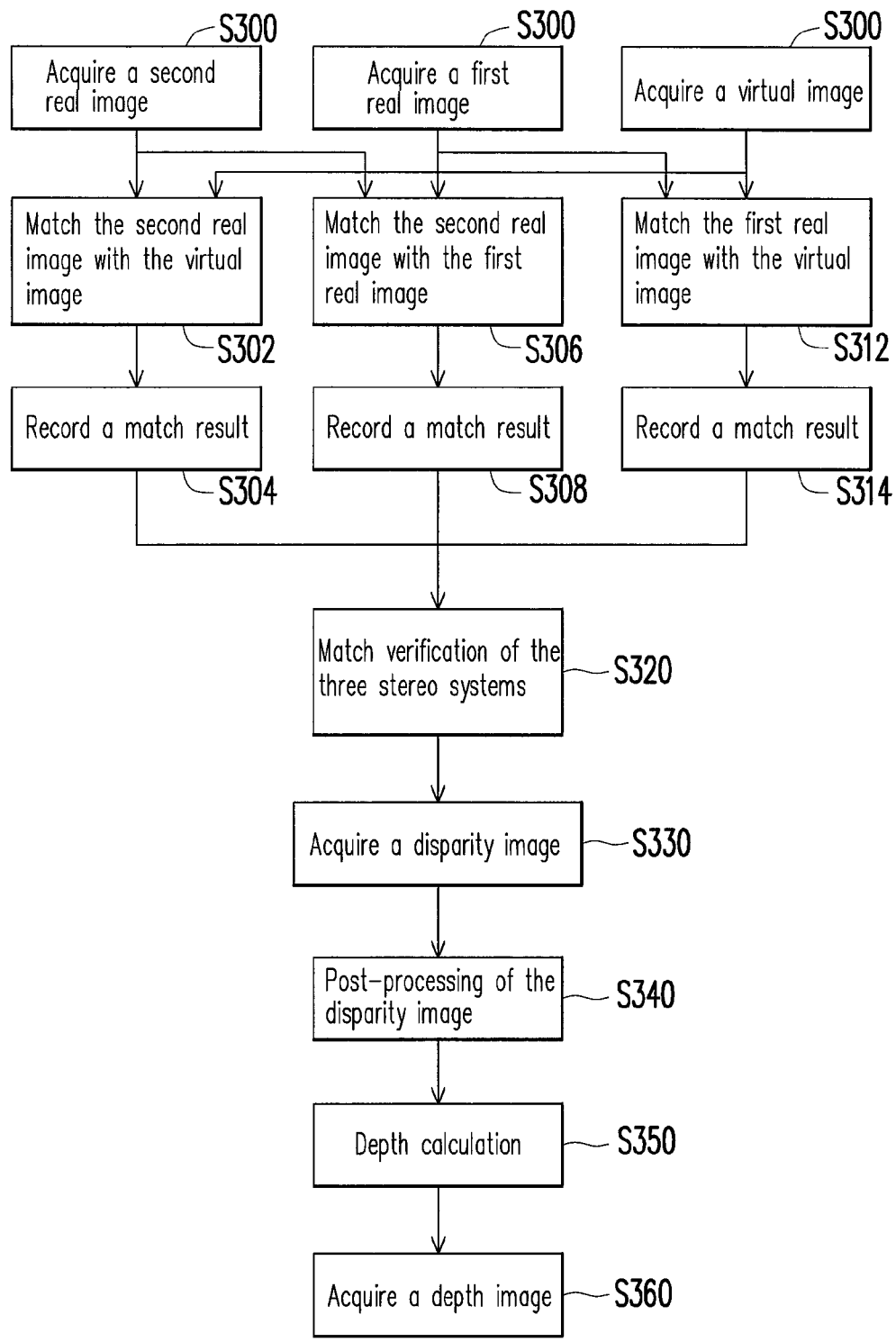
FIG. 10 illustrates a measurement process of a virtual three-camera system formed by two real cameras and one virtual camera.

FIG. 10 illustrates a measurement process of a virtual three-camera system formed by two real cameras and one virtual camera. The configuration may be one shown in FIGS. 9A to 9C. In the exemplary embodiment, two real cameras respectively form, together with a virtual camera, three stereo pairs of "real-real", "real-virtual", and "real-virtual".

Referring to FIG. 10, first in Step S300, a depth image acquiring system respectively acquires a first real image, a second real image, and a virtual image. The first real image and the second real image are images acquired by two image sensing device which are obtained by an image processing unit, and the virtual image is a projection image of a projecting device.

Then, in Steps S302, S306, and S312, for example, the image processing unit of the depth image acquiring system matches the second real image with the virtual image, matches the second real image with the first real image, and matches the first real image with the virtual image. During matching, for example, with the first real image as a reference, a pixel is selected first, and then a pixel matching the pixel is found in the second real image and the virtual image by block matching. Then, in Steps S304, S308, and S314, a match result is recorded respectively. A basic matching process between the real images (that is, the stereo pair formed by the two real cameras) may be made reference to FIG. 11, and a basic matching process between the real image and the virtual image (that is, the stereo pair formed by the real camera and the virtual camera) may be made reference to FIG. 12.

Then, in Step S320, the system matches the three stereo systems, to generate a matched pixel. Details of the processing process may be made to the description in FIG. 13.

In Step S330, based on the first real image, the match result of each pixel is recorded, and the match result is described with a two-dimensional image format; and the image is referred to as a disparity image. In Step S340, conventional image processing techniques (for example, smoothing and noise reduction) may be used for post-processing of the disparity image. Furthermore, the disparity image may be analyzed according to a geometric configuration of the cameras, for example, when the two cameras are configured to have a horizontal displacement, for each pixel from left to right along any horizontal line of an image, it is required that a match point thereof is also arranged from left to right. Then, in Step S350, a depth of each pixel is calculated according to the disparity image and calibration result of the camera system. In Step S360, after the depths of pixels in a whole measurement region are calculated, a depth image of the image is acquired.

In addition, although the reference image (the first image) shown in FIG. 10 is a real image, this is not necessary. According to practical requirement, the virtual image may also be used as the reference image. Processes in FIG. 10 are described in detail below.

Figure 11:
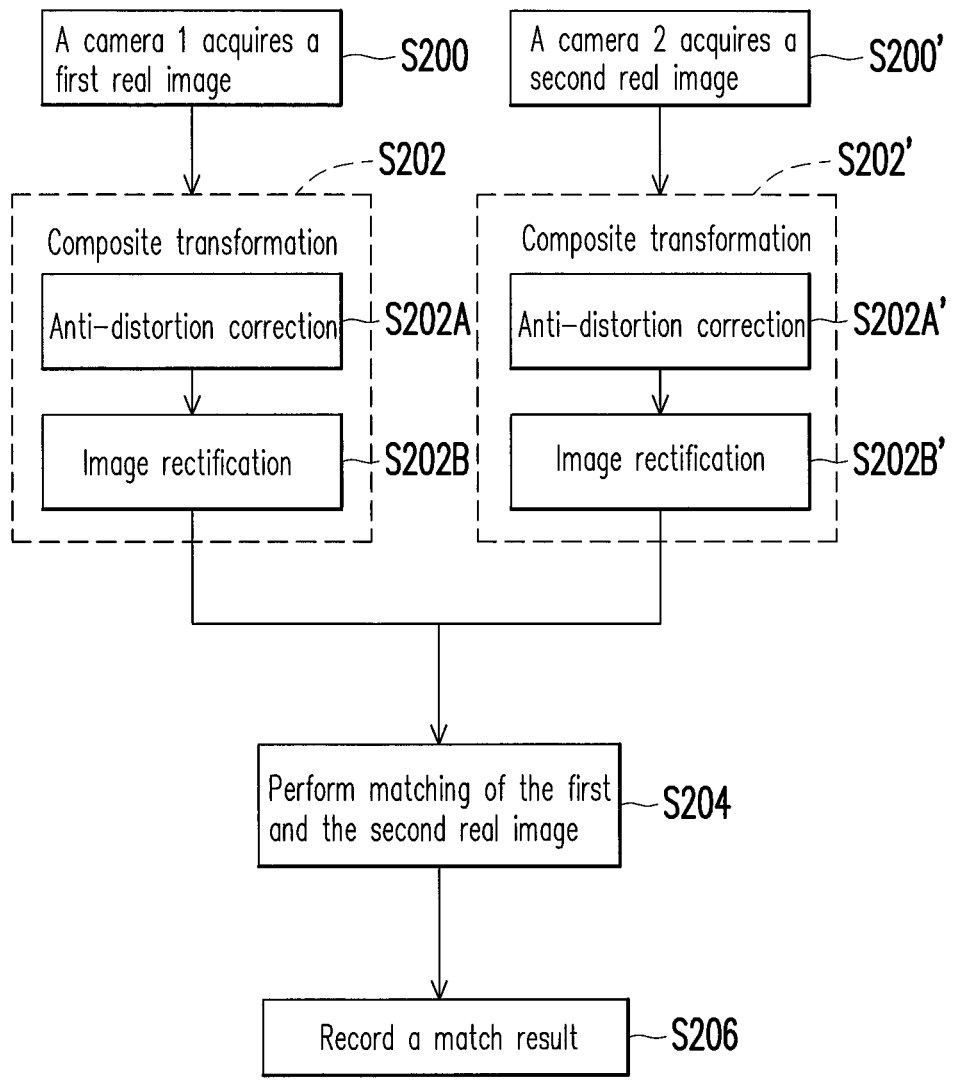
FIG. 11 is a schematic flow chart illustrating matching of images of two real cameras.

FIG. 11 is a schematic flow chart illustrating matching of images of two real cameras, in which a main processing process includes steps of lens distortion correction, image rectification, and image matching. First, in Steps S200, and S200', real cameras 1 and 2 (for example, the image sensing device shown in FIG. 1 or 4) respectively acquire a real image.

Then, in Steps S202A and S202A', image distortion effect of the images of the cameras is eliminated through anti-distortion correction, so that the images become an ideal image meeting pin-hole model. Subsequently, in Steps S202B and S202B', the two real images are further subjected to image rectification, so that the two real images have only a horizontal disparity or a vertical disparity (caused by location arrangement). For example, in disposition of the two cameras, a location difference, or a difference between elevation of angles of lenses exists. Through the image rectification, the real images can be converted into ones that are obtained in case that the cameras are arranged at the same image acquiring plane, so that only a horizontal or a vertical location difference are left. In this way, image distortion caused by angle of view is eliminated, and matching of the images can be easily implemented with software or hardware. The anti-distortion correction and the image rectification can be integrated into a single composite transformation Step S202 and S202'.

Then, image matching is performed in Step S204. After the two real images are rectified, matching can be performed on the two real images along the same horizontal line or vertical line, to calculate a pixel disparity of each pixel. In calculation, a matching function may be designed according to the features of the system and an object, for example, block matching may be employed. That is to say, a range of a region is set at two locations for matching, pixel disparity of the two real images in the range of the region is counted. A size and shape of a block, and a formula of the pixel discrepancy can be prescribed and designed according to practical requirements. A total pixel discrepancy is referred to as a matching cost, and the two images are more similar and matched, if the matching cost is smaller. In Step S204, the correctness of the matching can be increased by double check. For example, based on a pixel (i1, j1) of the first real image, a pixel (i2, j2) is found in the second real image that most matches the pixel (i1, j1) in the first real image; in contrast, based on the pixel (i2, j2) in the second real image, a most matched pixel found in the first real image must be (i1, j1).

Then, in Step S206, with the first real image (or the second real image) as a reference, a match result of each pixel is recorded. The match result may include information of a best match location, and a matching cost. The match result can be provided for use in subsequent processing for generating a depth image.

Figure 12:
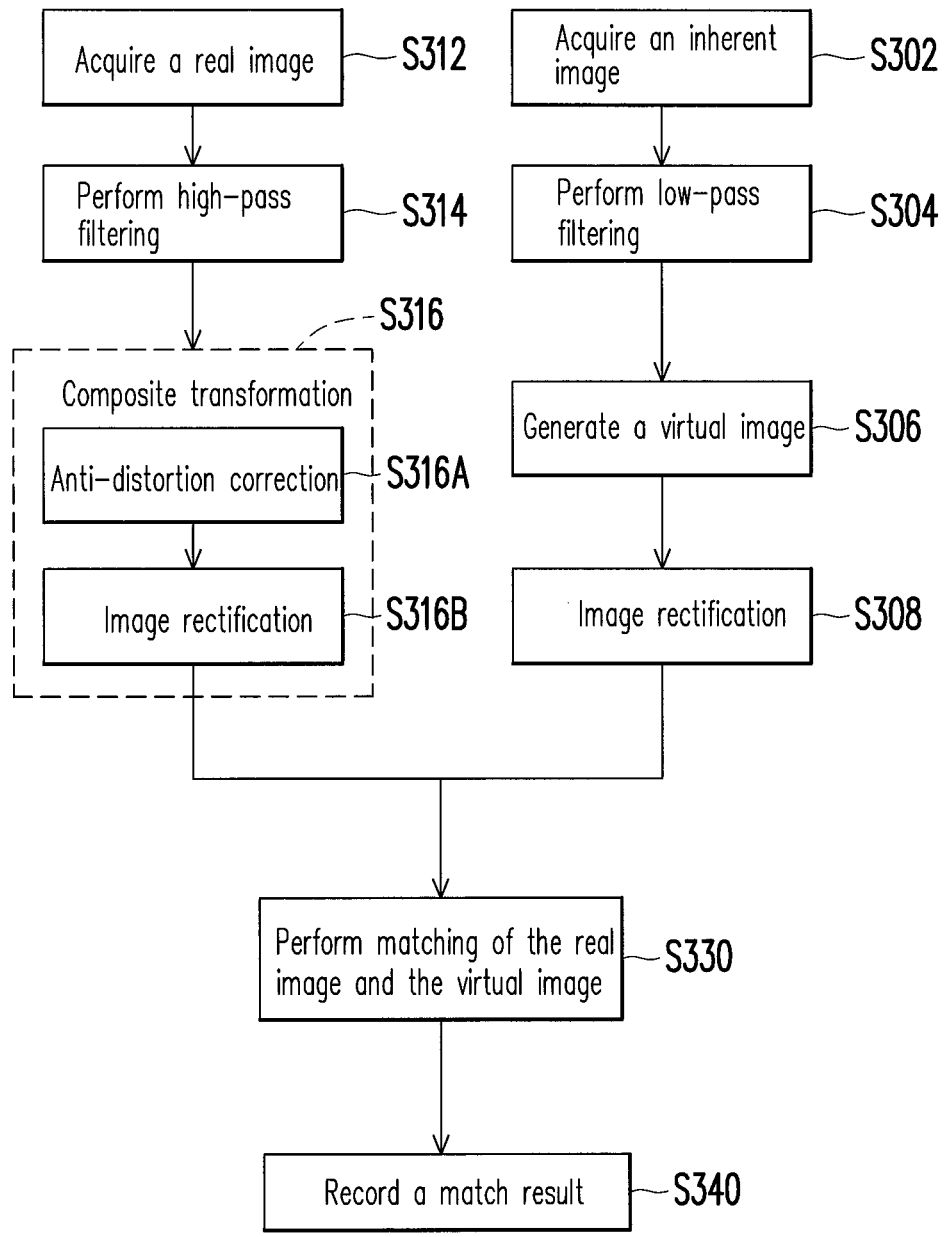
FIG. 12 is a schematic flow chart illustrating matching of a real image and a virtual image.

FIG. 12 is a schematic flow chart illustrating matching of a real image and a virtual image. For example, a real image acquired by one image sensing device (real camera) in FIG. 1 or 4 and a virtual image acquired by a projecting device serving as a virtual camera are matched. According to the above description, in local matching, an inherent image of a projecting device can be directly used to generate the virtual image.

In Step S302, an inherent image of the projecting device is acquired. Then, in Steps S304 and S306, low-pass filtering is performed on the inherent image, to remove a high-frequency signal, and generate a virtual image. The inherent image is generally an ideal image, which can be directly generated or derived mathematically. Therefore, compared with a common real image, the inherent image is sharper, and this can be mainly attributed to the high-frequency signal. As such, the high-frequency signal can be filtered off by using a low-pass filter, so that the inherent image is blurred, and thus is similar to the real image, thereby obtaining a good match result. The inherent image after low-pass filtering is referred to as a virtual image. Afterwards, image matching of the virtual image and the real image is performed.

In addition, in Step S312, a real camera acquires a real image. Subsequently, in Step S314, high-pass filtering processing (for example, by using a high-pass filter) is performed on the real image, to remove a low-frequency signal. A depth image acquiring device in this exemplary embodiment projects the inherent image of the projecting device (that is, the virtual camera) to a space, and then the inherent image is irradiated to an object, and imaged in the real camera, and becomes the so-called real image. As seen from a spectrum, the contribution of the object in a scenario to the real image largely belongs to a low-frequency part. Therefore, the influence of the object on the real image can be reduced by filtering off the low-frequency signal, and thus the component of the inherent image is highly reserved.

Through the low-pass filtering of the inherent image and the high-pass filtering processing of the real image, the real image and the virtual image become much similar, and thus the matching effect can be improved. Therefore, the low-pass filter of the inherent image and the high-pass filter of the real image are required to be matched, so that the processed two images have similar spectrum characteristics, thereby obtaining an optimum image match result.

Then, in Step S316A, the real image after the high-pass filtering processing needs to be subjected to anti-distortion correction, to eliminate various image distortion effect of the real camera, so that the image becomes an ideal image meeting the pin-hole model. In contrast, the virtual camera generally does not need the step, because the distortion effect has been considered in generation or calculation of the inherent image. The inherent image is an ideal image meeting the pin-hole model per se.

Subsequently, in Steps S316B and S308, the two images are both subjected to image rectification, so that the two images have only a horizontal disparity or a vertical disparity. As described in FIG. 11, the anti-distortion correction and the image rectification in S316A and S316B may be integrated into a single composite transformation Step S316.

Next, in Steps S330 and S340, image matching and recording of a match result are performed as described in FIG. 11, with the difference that objects of the image matching are the real image and the virtual image. Details may be made reference to the descriptions in Steps S204 and S206 in FIG. 11.

In addition, the low-pass filtering processing of the inherent image is a one-off operation, and may be implemented in advance. In order to simplify the implementation process, the high-pass filter of the real image may also be optionally removed. Herein, a method for obtaining matched high-pass filter and low-pass filter is also proposed in the exemplary embodiment, in which (1) the inherent image is projected to an even plane formed of a single material (for example, white wall) first, an image is acquired by the real camera, and then a spectrum of the image is calculated; (2) a spectrum of the inherent image is calculated; (3) the spectrum of the real image and the spectrum of the inherent image are individually binarized; (4) an intersection set of the two binarized spectra is obtained; and (5) the intersection set part is subtracted from the two binarized spectra respectively, and then the two spectra are inverted, and they are the needed high-pass and low-pass filters.

Figure 13:
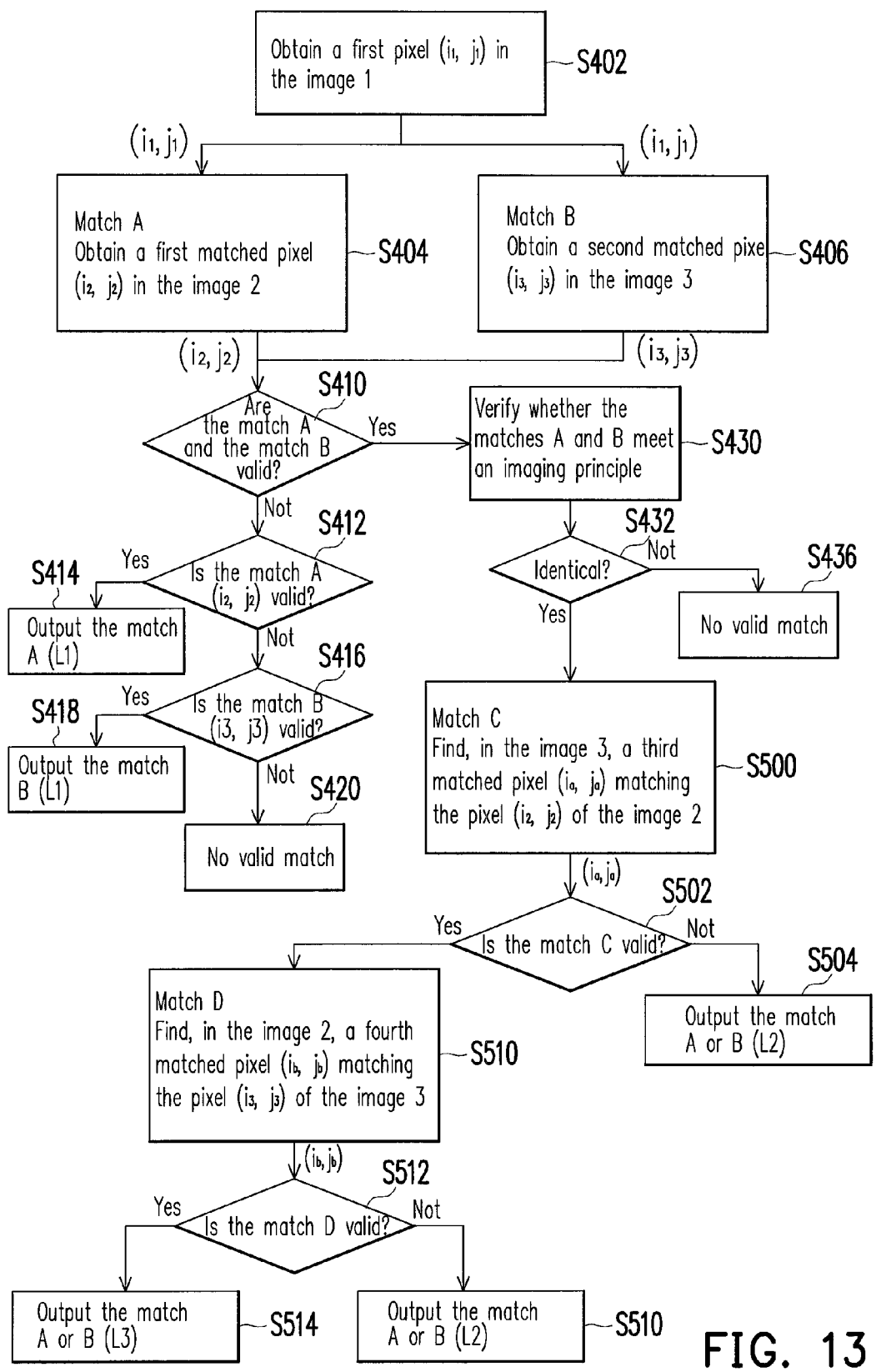
FIG. 13 illustrates a match verification process of a virtual three-camera system employing three stereo pairs.

FIG. 13 illustrates a match verification process of a virtual three-camera system employing three stereo pairs. It is assumed that images acquired by three cameras are respectively an image 1, an image 2, and an image 3, and the image 1 is used as a basis. In Step S402, a first pixel (i1, j1) in the image 1 is obtained.

In Step S404, an optimum first matched pixel (i2, j2) of the first pixel (i1, j1) is found in the image 2, which is referred to as a match A. In addition, in Step S406, an optimum second matched pixel (i3, j3) of the first pixel (i1, j1) is found in the image 3, which is referred to as a match B.

Then, in Step S410, it is determined whether the found matched pixels, that is the match A and the match B, are valid matches. In determination, whether the match A and the match B are valid matched results is determined, for example, by using a matching cost function and an overall analysis result of pixel disparity described above.

If a determination result of Step S410 is that the two matches A and B are both valid matches, in Step S430, a calibration parameter of the three-camera system may be used to verify whether the match A and the match B meet camera imaging principles. If the camera imaging principles are met, the match A and the match B are substantially identical. Therefore, in Step S432, it is determined whether the match A and the match B are consistent. If so, the match results are further subjected to match verification. In Step S500, the system further finds, in the image 3, a third matched pixel (ia, ja) matching the first pixel (i1, j1) of the image 2, that is, a match C. Then, it is determined whether the third matched pixel (ia, ja) is a valid matched pixel (Step S502), and if not, the match A or B is output as a match result at accuracy level 2 (L2) (Step S504).

If in Step S502, the system determines that the match C (the matched pixel (ia, ja)) is valid, Step S510 is further performed. In Step S510, a fourth matched pixel (ib, jb) matching the second matched pixel (i3, j3), that is, a match D, is found in the image 2. Then, it is determined whether the fourth matched pixel (ib, jb) is a valid matched pixel (Step S512). If a determination result is valid, the match A or B is output. In this case, as the match A or B has been subjected to further match verification, the accuracy level may further reach a level 3 (L3), that is, the match result in this case is a match result having the highest correctness index.

Furthermore, even if the determination result of the Step S512 is invalid, the match A or B still can be output at accuracy level 2 (L2) (Step S510). In this case, the match result is a match result having a medium correctness index (L2). The level of the correct index is helpful to the subsequent analysis of data.

In addition, if in Step S432, it is determined that the match A and the match B are not consistent, a result of no valid match is output (Step S436).

Furthermore, if the determination result in Step S410 is that only one is valid matched, processing in S412, S414, S416, and S418 is performed. That is, if only the match A is validly matched result, the match A is output (Steps S412 and S414). If only the match B is validly matched result, the match B is output (Steps S416 and S418). The above two match results are both match results having a low correctness index, and the match result is defined to have an accuracy level L1. This is because that there is no the third image for further verification. This case generally occurs due to occlusion of one stereo pair, but the match result can still be obtained from another stereo pair.

If both of the two matches A and B are not valid matched results, no valid matched is output in Step S420.

The level of the correctness index is helpful to the subsequent analysis of data, and the higher the correctness index is, the higher the accuracy level is, and the higher the correctness of a depth image obtained subsequently will be. Through the matching with the three stereo pairs, match results at various different levels of L1-L3 can be obtained.

The matching is generally proceeded to the matches A and B. If supplemental verification of matches C and D is further performed, the accuracy can be further improved.

Figure 14:
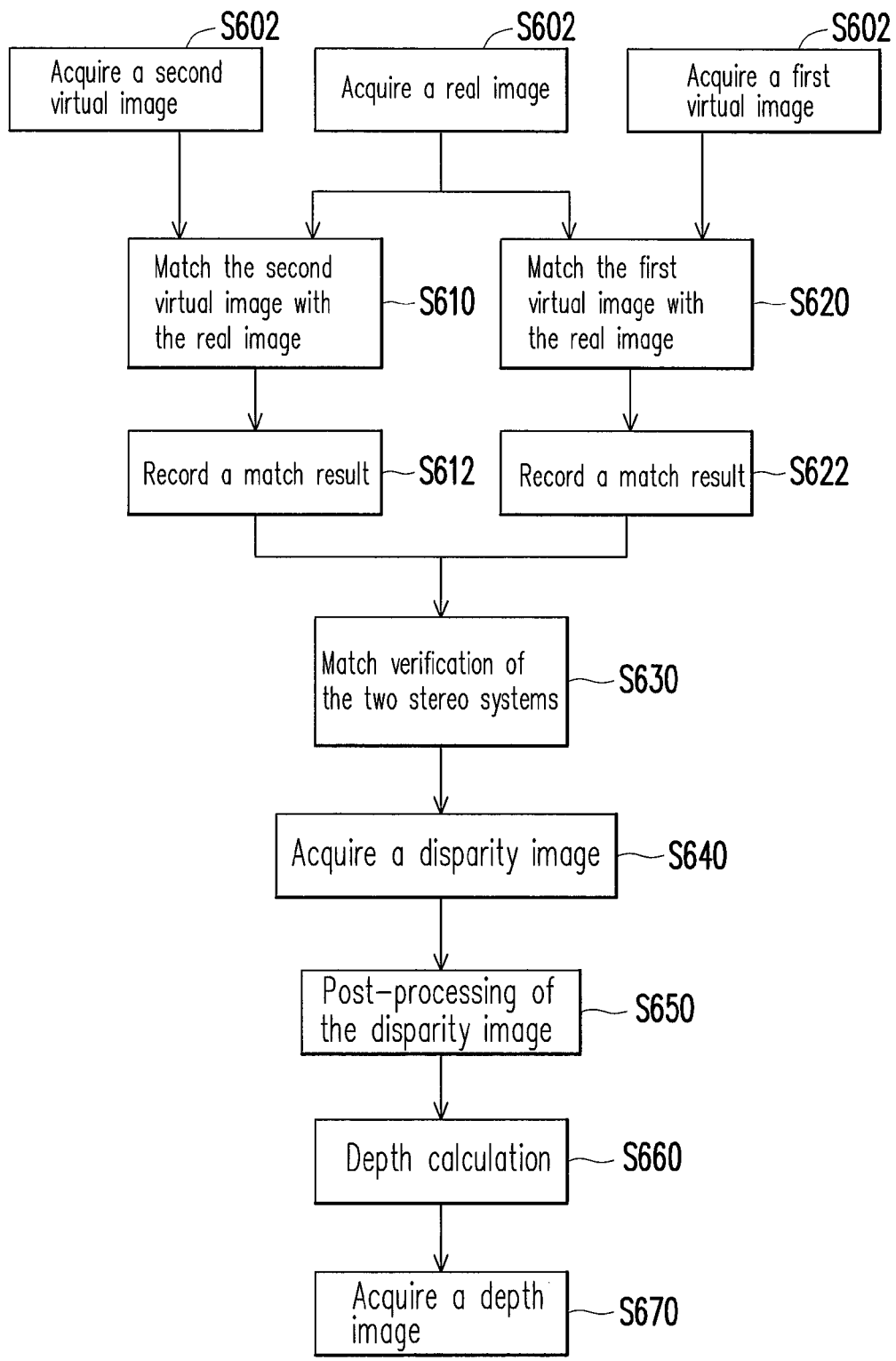
FIG. 14 illustrates a measurement process of a virtual three-camera system formed by two virtual cameras and one real camera.

FIG. 14 illustrates a measurement process of a virtual three-camera system formed by one real camera and two virtual cameras (the configuration shown in FIG. 9D or 9E). That is, a depth image acquiring system is mainly formed by one image sensing device (real camera) and two projecting devices (virtual cameras). In the exemplary embodiment, only two stereo pairs are formed, and this is because that image matching cannot be performed between two virtual cameras. In the configuration shown in FIG. 9D or 9E, the real camera forms two "real-virtual" stereo pairs respectively with the two virtual cameras.

Referring to FIG. 14, first in Step S602, the depth image acquiring system acquires a real image, a first virtual image, and a second virtual image respectively.

Then, in Step S610, the system matches the real image with the second virtual image, and in Step S620, matches the real image with the first virtual image. During matching, for example, with the real image as a reference, a pixel is selected first, and then pixels matching the pixel are found in the first and the second virtual image by block matching. Then, match results are respectively recorded in Steps S612 and S622. A basic matching process between the real image and the virtual image (that is, the stereo pair formed by the real camera and the virtual camera) may be made reference to FIG. 12.

Then, in Step S630, the system matches the two stereo systems, to generate a matched pixel. Details of a processing process may be made reference to the description in FIG. 15.

In Steps S640, based on the real image, a match result of each pixel is recorded, to obtain a disparity image. Step S650 is the same as Step S340 in FIG. 10, in which post processing is performed on the disparity image. Then, in Step S660, a depth of each pixel can be calculated according to the disparity image and calibration result of the camera system. In Step S670, after the depth of pixels in a whole measurement region is calculated, a depth image of the image is acquired.

Figure 15:
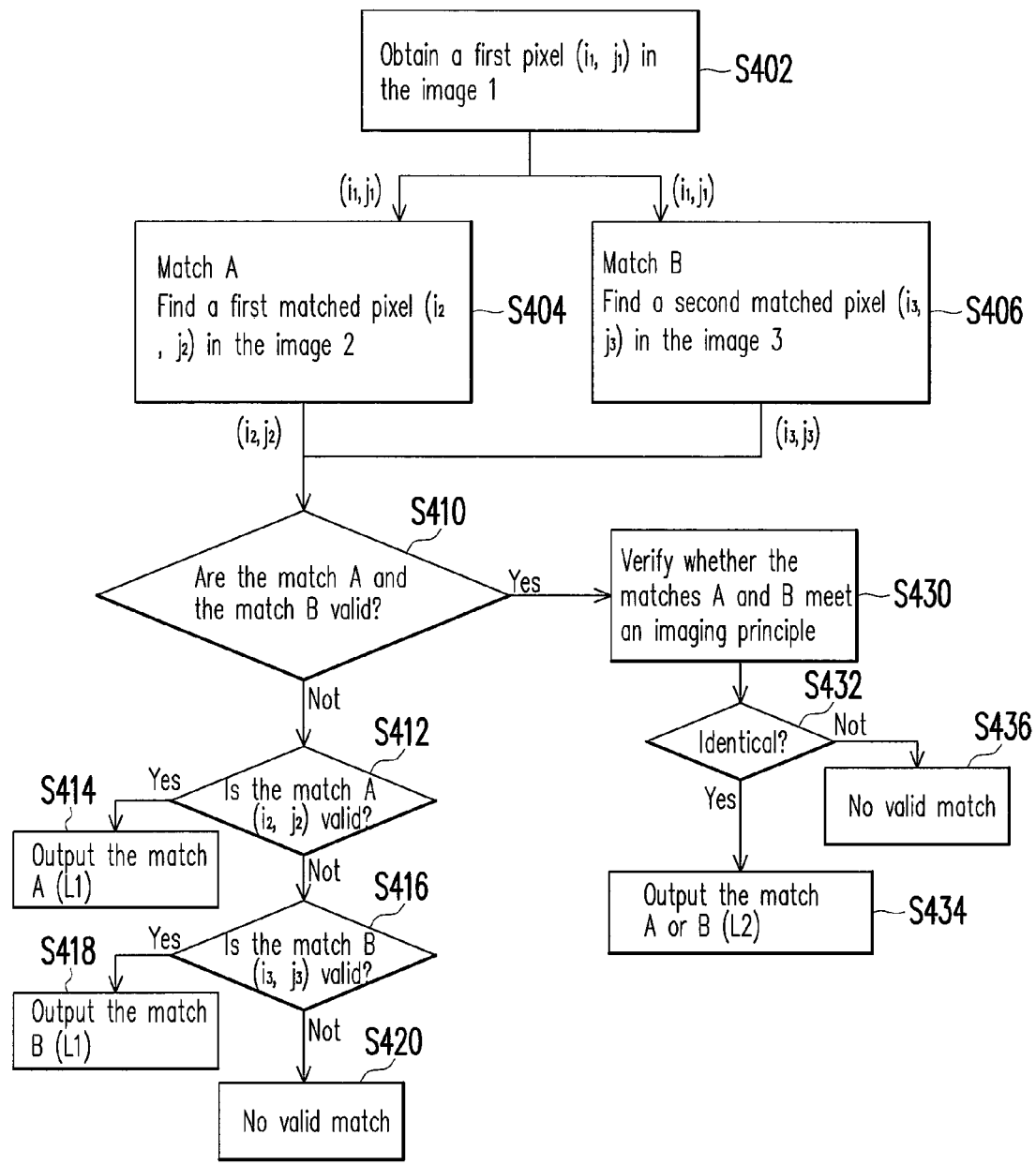
FIG. 15 illustrates a match verification process of a virtual three-camera system using two stereo pairs.

FIG. 15 illustrates a match verification process of a virtual three-camera system using two stereo pairs. The difference between FIG. 15 and FIG. 13 is that a matching procedure with a third stereo pair is omitted. Therefore, the same numerals are assigned to steps in which procedures that are the same as or similar to those in FIG. 13 are performed. After the system determines that matches A and B are identical in Step S432, the system outputs the match A or B at an accuracy level L2 as a match result in Step S434.

The level of a correctness index is helpful to the subsequent analysis of data. The higher the correctness index is, the high the accuracy level is, and the higher the accuracy of a depth image acquired subsequently will be. Through matching with the two stereo pairs, match results at various different levels of L1-L3 can be obtained.

In addition, in addition to the virtual three-camera configuration, the disclosure still includes other varied application examples. For example, a depth image acquiring device may use one projecting device and one image sensing device. In this case, the projecting device projects a projection pattern to an object. The projecting device still serves as a virtual image sensing device, and an inherent image of the projection pattern is served as a virtual image. The image sensing device can sense the projection pattern projected to the object, to generate a real image. Under the configuration, the virtual image is matched with the real image, to find a matched pixel, thereby generating a depth image. Under the configuration, the verification procedure may be not performed, and the image matching may be formed following the process shown in FIG. 12.

In addition, a depth image acquiring device may use one projecting device and two image sensing device. In this case, the projecting device only functions to project a projection pattern to an object. The two image sensing devices can sense the projection pattern projected to the object, to generate a real image respectively. Under the configuration, the two real images are matched, to find a matched pixel, thereby generating a depth image. Under the configuration, the verification procedure may be not performed, and the image matching may be formed following the process shown in FIG. 11.

To sum up, in this application, two or more image sensing devices are employed, no reference image is required to be created for matching, block matching of images acquired by the image sensing devices is directly performed, and depth information is obtained with reference to matching information of a projecting device (a virtual camera) and the real cameras. The accuracy for depth measurement can be improved by using the virtual three-cameral configuration formed by the real cameras and the virtual camera. Moreover, the occlusion problem that may be caused in triangulation measurement can be overcomed by using the configuration.

Furthermore, in this application, matching between a virtual image and a real image or matching between two real images may also be performed without verification, with which although the correctness and completeness of a result may become poor, hardware design cost and calculation times can be reduced.

It will be apparent to those skilled in the art that various modifications and changes can be made to the structure of the disclosed embodiments without departing from the scope or spirit of the disclosure. In view of the foregoing, it is intended that the disclosure cover modifications and changes of this disclosure provided they fall within the scope of the following claims and their equivalents.

What is claimed is:

1. A depth image acquiring device, comprising:
   at least one projecting device, for projecting a projection pattern to an object, wherein the projecting device serves as a virtual image sensing device, and an inherent image of the projection pattern serves as a virtual image;
   a first and a second image sensing device, for sensing the projection pattern projected to the object respectively, to generate a first real image and a second real image; and
   an image processing unit, coupled to the projecting device and the first and the second image sensing device,
   wherein the image processing unit matches pixels in the first real image with those in the second real image respectively, to obtain a first matched image, and matches the pixels in the first real image with those in the virtual image respectively, to obtain a second matched image;
   performs match verification by using the first and the second matched image, to output a verified matched image, wherein a pixel in the verified matched image is one of the pixels in the first and the second matched image; and
   wherein the outputting of each of the matched images further comprises: determining whether the pixel in the first and the second matched image is validly matched; when only one of the pixels in the first and the second matched image is validly matched, outputting a match result of the pixel in the first or the second matched image that is validly matched, and when both of the pixels in the first and the second matched image are not validly matched, outputting a match result of no valid match; when both the pixels in the first and the second matched image are validly matched, verifying whether the pixels in the first and the second matched image are identical; and when the pixels in the first and the second matched image are identical, outputting any one of match results of the pixels in the first and the second matched image, and if not, outputting a match result of no valid match;
   generates a disparity image according to values of pixels in the first real image and pixels in the verified matched image, and calculates a corresponding depth value according to the disparity image, so as to generate a depth image.

2. The depth image acquiring device according to claim 1, wherein the projecting device further comprises:
   a light source, for emitting a projecting light beam; and
   a projection pattern generating element, configured in a light path of the light source, for generating the projection pattern under irradiation with the light source.

3. The depth image acquiring device according to claim 2, wherein the projecting device further comprises:
   a lens set, configured in the light path of the projection pattern generating element, for projecting the projection pattern generated from the projection pattern generating element to the object.

4. The depth image acquiring device according to claim 2, wherein the projection pattern generating element is a diffractive optical element (DOE).

5. The depth image acquiring device according to claim 4, wherein the DOE comprises one of a computer generated hologram (CGH), a grating, and a phase DOE.

6. The depth image acquiring device according to claim 2, wherein the projection pattern generating element is a mask.

7. The depth image acquiring device according to claim 2, wherein the light source is one of infrared laser, a light emitting diode (LED), ultraviolet light, and visible light.

8. The depth image acquiring device according to claim 1, further comprising a first and a second optical filter, respectively configured before the first and the second image sensing device.

9. The depth image acquiring device according to claim 1, wherein the projection pattern is pre-designed or generated at random, or a scattered dot pattern distributed at random.

10. The depth image acquiring device according to claim 2, further comprising a controller, coupled to the projecting device, and the first and the second image sensing device, for driving the light source in a pulse-wave driving mode.

11. A depth image acquiring device, comprising:
    a first and a second projecting device, for respectively projecting a projection pattern on an object, wherein the first and the second projecting device serve as a first and a second virtual image sensing device, and an inherent image of the projection pattern serves as a first and a second virtual image imaged by the first and the second virtual image sensing device;

an image sensing device, for sensing the projection pattern projected to the object, to generate a real image; and an image processing unit, coupled to the first and the second projecting device, and the image sensing device, wherein the image processing unit matches pixels in the real image with those in the first virtual image, to obtain a first matched image, and matches the pixels in the real image with those in the second virtual image, to obtain a second matched image;

performs match verification by using the first and the second matched image, to output a verified matched image, wherein a pixel in the verified matched image is one of the pixels in the first and the second matched image; and wherein the outputting of each of the matched images further comprises: determining whether the pixel in the first and the second matched image is validly matched; when only one of the pixels in the first and the second matched image is validly matched, outputting a match result of the pixel in the first or the second matched image that is validly matched, and when both of the pixels in the first and the second matched image are not validly matched, outputting a match result of no valid match; when both the pixels in the first and the second matched image are validly matched, verifying whether the pixels in the first and the second matched image are identical; and when the pixels in the first and the second matched image are identical, outputting any one of match results of the pixels in the first and the second matched image, and if not, outputting a match result of no valid match;

generates a disparity image according to values of pixels in the real image and pixels in the verified matched image, and calculates a corresponding depth value according to the disparity image, so as to generate a depth image.

12. The depth image acquiring device according to claim 11, wherein the first and the second projecting device further respectively comprise:

a light source, for emitting a projecting light beam; and a projection pattern generating element, configured in a light path of the light source, for generating the projection pattern under irradiation with the light source.

13. The depth image acquiring device according to claim 12, wherein the first and the second projecting device further respectively comprise:

a lens set, configured in a light path of a projection pattern generating element, for projecting the projection pattern generated with a light source through the projection pattern generating element to the object.

14. The depth image acquiring device according to claim 12, wherein the projection pattern generating element is a diffractive optical element (DOE).

15. The depth image acquiring device according to claim 14, wherein the DOE comprises a computer generated hologram (CGH), a grating, and a phase DOE.

16. The depth image acquiring device according to claim 12, wherein the projection pattern generating element is a mask.

17. The depth image acquiring device according to claim 12 wherein the light source is one of infrared laser, a light emitting diode (LED), ultraviolet light, and visible light.

18. The depth image acquiring device according to claim 11, further comprising an optical filter, configured before the image sensing device.

19. The depth image acquiring device according to claim 11, wherein the projection pattern is pre-designed or generated at random, or a scattered dot pattern distributed at random.

20. The depth image acquiring device according to claim 11, wherein each of light sources of the first and the second projecting device is controlled by time division or spectrum division.

21. A depth image acquiring method, for acquiring a depth image of an object, and applicable to a depth image acquiring device having a projecting device, and a first and a second image sensing device, comprising:

projecting, by the projecting device, a projection pattern to the object, and sensing, by the first and the second image sensing device, the projection pattern projected to the object, to generate a first real image and a second real image, wherein the projecting device serves as a virtual image sensing device, and converts an inherent image of the projection pattern into a virtual image;

matching pixels in the first real image with those in the second real image, to obtain a first matched image;

matching the pixels in the first real image with those in the virtual image, to obtain a second matched image;

performing match verification by using the first and the second matched image, to output a verified matched image, wherein a pixel in the verified matched image is one of the pixels in the first and the second matched image; and wherein the outputting of each of the matched images further comprises: determining whether the pixel in the first and the second matched image is validly matched; when only one of the pixels in the first and the second matched image is validly matched, outputting a match result of the pixel in the first or the second matched image that is validly matched, and when both of the pixels in the first and the second matched image are not validly matched, outputting a match result of no valid match; when both the pixels in the first and the second matched image are validly matched, verifying whether the pixels in the first and the second matched image are identical; and when the pixels in the first and the second matched image are identical, outputting any one of match results of the pixels in the first and the second matched image, and if not, outputting a match result of no valid match;

generating a disparity image according to values of the pixels in the first real image and pixels in the verified matched image, and calculating a corresponding depth value according to the disparity image, so as to generate the depth image.

22. The depth image acquiring method according to claim 21, further comprising:

performing anti-distortion correction respectively on the first real image and the second real image;

performing image rectification respectively on the first real image and the second real image after the anti-distortion correction; and matching the first real image and the second real image after performing image rectification, to obtain the first matched image.

23. The depth image acquiring method according to claim 21, further comprising:

performing a high-pass filtering processing on the first real image, and performing a low-pass filtering on the inherent image, to generate the virtual image;

performing anti-distortion correction on the first real image after the high-pass filtering processing;

performing image rectification respectively on the first real image after the anti-distortion correction and the virtual image; and matching the first real image and the virtual image after performing image rectification, to obtain the second matched image.

24. The depth image acquiring method according to claim 21, wherein the determining of whether the pixels in the first and the second matched image are validly matched is realized by using a matching cost function of the pixels in the first and the second matched image.

25. The depth image acquiring method according to claim 24, wherein the verifying of whether the pixels in the first and the second matched image are identical is based on on a camera imaging principle.

26. The depth image acquiring method according to claim 21, wherein when the pixels in the first and the second matched image are identical, the method further comprises:

obtaining a pixel in a third matched image matching the pixel in the first matched image from the virtual image;

determining whether the pixel in the third matched image is validly matched;

when the pixel of the third matched image is not validly matched, outputting any one of the match results of the pixel in the first or the second matched image;

when the pixel of the third matched image is validly matched, obtaining a pixel in a fourth matched image matching the pixel in the second matched image from the second real image; and determining whether the pixel in the fourth matched image is validly matched, and outputting any one of the match results of the pixel in the first or the second matched image, wherein the accuracy of the match result when the pixel in the fourth matched image is validly matched is greater than that of the match result when the pixel in the fourth matched image is not validly matched.

27. The depth image acquiring method according to claim 21, wherein the disparity image is generated through triangulation measurement.

28. A depth image acquiring method, for acquiring a depth image of an object, and applicable to a depth image acquiring device having a first and a second projecting device and an image sensing device, comprising:

projecting, by the first and the second projecting device, a projection pattern to the object, and sensing, by the image sensing device, the projection pattern projected to the object, to generate a real image, wherein the first and the second projecting device serve as a first and a second virtual image sensing device, and convert an inherent image of the projection pattern into a first and a second virtual image;

matching pixels in the real image with those in the first virtual image, to obtain a first matched image, and matching the pixels in the real image with those in the second virtual image, to obtain a second matched image;

performing match verification by using pixels in first and the second matched image, to output a verified matched image, wherein a pixel in the verified matched image is one of the pixels in the first and the second matched image; and wherein the outputting of each of the matched images further comprises: determining whether the pixel in the first and the second matched image is validly matched; when only one of the pixels in the first and the second matched image is validly matched, outputting a match result of the pixel in the first or the second matched image that is validly matched, and when both of the pixels in the first and the second matched image are not validly matched, outputting a match result of no valid match; when both the pixels in the first and the second matched image are validly matched, verifying whether the pixels in the first and the second matched image are identical; and when the pixels in the first and the second matched image are identical, outputting any one of match results of the pixels in the first and the second matched image, and if not, outputting a match result of no valid match;

generating a disparity image according to values of the pixels in the real image and the pixels in the verified matched image, and calculating a corresponding depth value according to the disparity image, so as to generate the depth image.

29. The depth image acquiring method according to claim 28, further comprising:

performing a high-pass filtering processing on the real image, and performing low-pass filtering on the inherent image, to generate the first and the second virtual image;

performing anti-distortion correction on the real image after the high-pass filtering processing;

performing image rectification respectively on the real image after the anti-distortion correction and the first and the second virtual image; and matching the real image and the first and the second virtual image after performing image rectification, to obtain the first matched image and the second matched image.

30. The depth image acquiring method according to claim 28, wherein the determining of whether the pixels in the first and the second matched image are validly matched is realized by using a matching cost function of the pixels in the first and the second matched image.

31. The depth image acquiring method according to claim 30, wherein the verifying of whether the pixels in the first and the second matched image are identical is based on on a camera imaging principle.

32. The depth image acquiring method according to claim 29, wherein the disparity image is generated through triangulation measurement.

33. A depth image acquiring device, comprising:

a projecting device, for projecting a projection pattern to an object, wherein the projecting device serves as a virtual image sensing device, and an inherent image of the projection pattern serves as a virtual image;

an image sensing device, for sensing the projection pattern projected to the object, to generate a real image; and an image processing unit, coupled to the projecting device and the image sensing device, wherein the image processing unit matches pixels in the real image with those in the virtual image, to obtain a matched image; and matches the pixels in the first real image with those in the virtual image respectively, to obtain a second matched image; performs match verification by using the first and the second matched image, to output a verified matched image, wherein a pixel in the verified matched image is one of the pixels in the first and the second matched image; and wherein the outputting of each of the matched images further comprises: determining whether the pixel in the first and the second matched image is validly matched; when only one of the pixels in the first and the second matched image is validly matched, outputting a match result of the pixel in the first or the second matched image that is validly matched, and when both of the pixels in the first and the second matched image are not validly matched, outputting a match result of no valid match; when both the pixels in the first and the second matched image are validly matched, verifying whether the pixels in the first and the second matched image are identical; and when the pixels in the first and the second matched image are identical, outputting any one of match results of the pixels in the first and the second matched image, and if not, outputting a match result of no valid match;

generates a disparity image according to values of the pixels in the real image and the pixels in the matched image, and calculates a corresponding depth value according to the disparity image, so as to generate a depth image.

34. The depth image acquiring device according to claim 33, wherein the projecting device further comprises:
a light source, for emitting a projecting light beam; and
a projection pattern generating element, configured in a light path of the light source, for generating the projection pattern under irradiation with the light source.

35. The depth image acquiring device according to claim 34, wherein the projecting device further comprises:
a lens set, configured in the light path of the projection pattern generating element, for projecting the projection pattern generated with the light source through the projection pattern generating element to the object.

36. The depth image acquiring device according to claim 34, wherein the projection pattern generating element is a diffractive optical element (DOE).

37. The depth image acquiring device according to claim 36, wherein the DOE comprises one of a computer generated hologram (CGH), a grating, and a phase DOE.

38. The depth image acquiring device according to claim 34, wherein the projection pattern generating element is a mask.

39. The depth image acquiring device according to claim 34 wherein the light source is one of infrared laser, a light emitting diode(LED), ultraviolet light, and visible light.

40. The depth image acquiring device according to claim 33, further comprising an optical filter, configured before the image sensing device.

41. The depth image acquiring device according to claim 33, wherein the projection pattern is pre-designed or generated at random, or a scattered dot pattern distributed at random.

42. The depth image acquiring device according to claim 33, further comprising a controller, coupled to the projecting device, and the image sensing device, for driving a light source in a pulse-wave driving mode.

43. A depth image acquiring device, comprising:
at least one projecting device, for projecting a projection pattern to an object;
a first and a second image sensing devices, for sensing the projection pattern projected to the object respectively, to generate a first real image and a second real image; and
an image processing unit, coupled to the projecting device and the first and the second image sensing devices,
wherein the image processing unit matches pixels in the first real image with those in the second real image respectively, to obtain a matched image; and
wherein the outputting of each of the matched images further comprises: determining whether the pixel in the first and the second matched image is validly matched; when only one of the pixels in the first and the second matched image is validly matched, outputting a match result of the pixel in the first or the second matched image that is validly matched, and when both of the pixels in the first and the second matched image are not validly matched, outputting a match result of no valid match, when both the pixels in the first and the second matched image are validly matched, verifying whether the pixels in the first and the second matched image are identical; and when the pixels in the first and the second matched image are identical, outputting any one of match results of the pixels in the first and the second matched image, and if not, outputting a match result of no valid match, add matches the pixels in the first real image with those in the virtual image respectively, to obtain a second matched image; performs match verification by using the first and the second matched image, to output a verified matched image, wherein a pixel in the verified matched image is one of the pixels in the first and the second matched image; and wherein the outputting of each of the match images further comprises: determining whether the pixel in the first and the second matched image is validly matched, when only one of the pixels in the first and the second matched image is validly matched, outputting a match result of the pixel in the first or the second matched image that is validly matched, and when both of the pixels in the first and the second matched image are not validly matched, outputting a match result of no valid match; when both the pixels in the first and the second matched image are validly matched, verifying whether the pixels in the first and the second matched image are identical; and when the pixels in the first and the second matched image are identical, outputting any one of match results of the pixels in the first and the second matched image, and if not, outputting a match result of no valid match;

generates a disparity image according to values of the pixels in the first real image and pixels in the matched image, and calculates a corresponding depth value according to the disparity image, so as to generate a depth image.

44. The depth image acquiring device according to claim 43, wherein the projecting device further comprises:
a light source, for emitting a projecting light beam; and
a projection pattern generating element, configured in a light path of the light source, for generating the projection pattern under irradiation with the light source.

45. The depth image acquiring device according to claim 43, wherein the projecting device further comprises:
a lens set, configured in a light path of a projection pattern generating element, for projecting the projection pattern generated with a light source through the projection pattern generating element to the object.

46. The depth image acquiring device according to claim 44, wherein the projection pattern generating element is a DOE.

47. The depth image acquiring device according to claim 46, wherein the DOE comprises a computer generated hologram (CGH), a grating, and a phase DOE.

48. The depth image acquiring device according to claim 44, wherein the projection pattern generating element is a mask.

49. The depth image acquiring device according to claim 43, further comprising an optical filter, configured before the image sensing device.

50. The depth image acquiring device according to claim 43, wherein the projection pattern is pre-designed or generated at random, or a scattered dot pattern distributed at random.

51. The depth image acquiring device according to claim 43, further comprising a controller, coupled to the projecting device, and the first and the second image sensing devices, for driving a light source in a pulse-wave driving mode.

52. A depth image acquiring system, for acquiring a depth image of an object, comprising a plurality of depth image acquiring devices, wherein each of the depth image acquiring devices generates a depth image through matching processes by using two real images and one virtual image, using one real image and two virtual images, using one real image and one virtual image, or using two real images, and the virtual image is obtained from a projecting device of depth image acquiring device wherein one of, a portion of, or every one of the depth image acquiring devices further comprise: a first and a second projecting device, for respectively projecting a projection pattern on the object, wherein the first and the second projecting device serve as a first and a second virtual image sensing device, and an inherent image of the projection pattern serves as a first and a second virtual image imaged by the first and the second virtual image sensing device; and image sensing device, for sensing the projection pattern projected to the object, to generate a real image; and an image processing unit, coupled to the first and the second projecting device, and the image sensing device, wherein the image processing unit matches pixels in the real image with those in the first virtual image, to obtain a first matched image, and matches the pixels in the real image with those in the second virtual image, to obtain a second matched image; performs match verification by using the first and the second matched image, to output a verified matched image, wherein a pixel in the verified matched image is one of the pixels in the first and the second matched image; and wherein the outputting of each of the matched images further comprises: determining whether the pixel in the first and the second matched image is validly matched; when only one of the pixels in the first and the second matched image is validly matched, outputting a match result of the pixel in the first or the second matched image that is validly matched, and when both of the pixels in the first and the second matched image are not validly matched, outputting a match result of no valid match; when both the pixels in the first and the second matched image are validly matched, verifying whether the pixels in the first and the second matched image are identical; and when the pixels in the first and the second matched image are identical, outputting any one of match results of the pixels in the first and the second matched image, and if not, outputting a match result of no valid match and generates a disparity image according to values of pixels in the real image and pixels in the verified matched image, and calculates a corresponding depth value according to the disparity image, so as to generate the depth image.

53. The depth image acquiring system according to claim 52, wherein one of, a portion of, or every one of the depth image acquiring devices further comprises:

at least one projecting device, for projecting a projection pattern to the object, wherein the projecting device serves as a virtual image sensing device, and an inherent image of the projection pattern serves as a virtual image;

a first and a second image sensing device, for sensing the projection pattern projected to the object respectively, to generate a first real image and a second real image; and an image processing unit, coupled to the projecting device and the first and the second image sensing device, wherein the image processing unit matches pixels in the first real image with those in the second real image respectively, to obtain a first matched image, and matches the pixels in the first real image with those in the virtual image respectively, to obtain a second matched image;

performs match verification by using the first and the second matched image, to output a verified matched image, wherein a pixel in the verified matched image is one of the pixels in the first and the second matched image; and generates a disparity image according to values of pixels in the first real image and pixels in the verified matched image, and calculates a corresponding depth value according to the disparity image, so as to generate the depth image.

54. The depth image acquiring system according to claim 52, wherein one of, a portion of, or every one of the depth image acquiring devices further comprises:

a projecting device, for projecting a projection pattern to the object, wherein the projecting device serves as a virtual image sensing device, and an inherent image of the projection pattern serves as a virtual image;

an image sensing device, for sensing the projection pattern projected to the object, to generate a real image; and an image processing unit, coupled to the projecting device and the image sensing device, wherein the image processing unit matches pixels in the real image with those in the virtual image, to obtain a matched image; and generates a disparity image according to values of the pixels in the real image and the pixels in the matched image, and calculates a corresponding depth value according to the disparity image, so as to generate the depth image.

55. The depth image acquiring system according to claim 52, wherein one of, a portion of, or every one of the depth image acquiring devices further comprises:

at least one projecting device, for projecting a projection pattern to the object;

a first and a second image sensing device, for sensing the projection pattern projected to the object respectively, to generate a first real image and a second real image; and an image processing unit, coupled to the projecting device and the first and the second image sensing device, wherein the image processing unit matches pixels in the first real image with those in the second real image respectively, to obtain a matched image.

56. The depth image acquiring system according to claim 52, wherein each of the depth image acquiring devices acquires an image with a light source having a different wavelength.

57. The depth image acquiring system according to claim 52, wherein each of the depth image acquiring devices acquires an image by time division.

* * * * *